US011403584B2

(12) United States Patent
Srinivasan et al.

(10) Patent No.: US 11,403,584 B2
(45) Date of Patent: Aug. 2, 2022

(54) SYSTEM AND METHOD OF FACILITATING DELIVERY OF GOODS TO A CUSTOMER

(71) Applicant: Target Brands, Inc., Minneapolis, MN (US)

(72) Inventors: Aarthi Srinivasan, Los Altos, CA (US); James Neumann, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 36 days.

(21) Appl. No.: 16/001,775

(22) Filed: Jun. 6, 2018

(65) Prior Publication Data
US 2019/0378080 A1    Dec. 12, 2019

(51) Int. Cl.
*G06Q 10/08* (2012.01)
*G06Q 20/20* (2012.01)

(52) U.S. Cl.
CPC ......... *G06Q 10/083* (2013.01); *G06Q 20/208* (2013.01)

(58) Field of Classification Search
CPC .................................................. G06Q 10/083
See application file for complete search history.

(56) References Cited

U.S. PATENT DOCUMENTS

| 8,863,245 | B1 * | 10/2014 | Abhyanker | ............ G06Q 10/10 726/4 |
| 9,727,837 | B1 | 8/2017 | Campbell, Jr. et al. | |
| 9,805,536 | B2 | 10/2017 | Lutnick et al. | |
| 10,019,860 | B1 | 7/2018 | Kim et al. | |
| 10,282,766 | B2 | 5/2019 | Rellas et al. | |
| 10,296,865 | B2 | 5/2019 | Schmidt | |
| 10,453,025 | B2 | 10/2019 | Agasti et al. | |
| 2004/0186811 | A1 * | 9/2004 | Gullo | ................... G06Q 10/083 705/402 |
| 2005/0038758 | A1 | 2/2005 | Hilbush et al. | |
| 2006/0282271 | A1 | 12/2006 | Ananda et al. | |

(Continued)

FOREIGN PATENT DOCUMENTS

WO    WO-2017136956 A1 *    8/2017    ......... G06Q 30/0226

OTHER PUBLICATIONS

FavorCart—Apps on Google Play, https://play.google.com/store/apps/details?id=com.favorcart&hl=en_US, FavorCart LLC, 3 pages (Sep. 8, 2016).

(Continued)

*Primary Examiner* — Peter Ludwig
*Assistant Examiner* — Avia Salman
(74) *Attorney, Agent, or Firm* — Merchant & Gould P.C.

(57) ABSTRACT

Methods and systems for facilitating delivery of goods from a retail location to a customer are disclosed. In one method, a request is received from a customer user which includes an order for goods to be delivered from a retail store. One or more delivery users within a predefined geographic area shared with a location of the customer user are identified. A delivery user agrees to pick up the customer's order and deliver the requested goods to the customer's home. Confirmation messages are automatically sent and received when the delivery user picks up the customer's order and again when the order is delivered to the customer. The delivery user can earn rewards or payments upon completion of successful delivery.

24 Claims, 32 Drawing Sheets

(56) References Cited

U.S. PATENT DOCUMENTS

| | | |
|---|---|---|
| 2010/0121670 A1 | 5/2010 | Saxena et al. |
| 2010/0241501 A1* | 9/2010 | Marshall ............ G06Q 30/0212 705/14.23 |
| 2011/0288922 A1 | 11/2011 | Thomas et al. |
| 2013/0191213 A1 | 7/2013 | Beck et al. |
| 2013/0262162 A1 | 10/2013 | Haney et al. |
| 2014/0164167 A1* | 6/2014 | Taylor ................ G06Q 30/0611 705/26.4 |
| 2014/0201100 A1* | 7/2014 | Rellas ................ G06Q 30/0607 705/330 |
| 2014/0222908 A1* | 8/2014 | Park ..................... G06F 3/0482 709/204 |
| 2014/0258167 A1 | 9/2014 | Rohmann et al. |
| 2014/0379529 A1 | 12/2014 | Agasti et al. |
| 2015/0120602 A1 | 4/2015 | Huffman et al. |
| 2015/0142594 A1 | 5/2015 | Lutnick et al. |
| 2015/0178778 A1 | 6/2015 | Lee et al. |
| 2015/0185034 A1 | 7/2015 | Abhyanker |
| 2015/0186869 A1 | 7/2015 | Winters et al. |
| 2015/0227890 A1* | 8/2015 | Bednarek ........... G06Q 10/0833 705/26.81 |
| 2015/0356502 A1 | 12/2015 | Agasti et al. |
| 2015/0363843 A1 | 12/2015 | Loppatto et al. |
| 2016/0098670 A1 | 4/2016 | Oz et al. |
| 2016/0098871 A1 | 4/2016 | Oz et al. |
| 2016/0180369 A1 | 6/2016 | Thomas et al. |
| 2016/0210591 A1 | 7/2016 | Lafrance |
| 2016/0247113 A1 | 8/2016 | Rademaker |
| 2016/0314429 A1 | 10/2016 | Gillen et al. |
| 2016/0328536 A1 | 11/2016 | Webb et al. |
| 2016/0364678 A1 | 12/2016 | Cao |
| 2016/0364679 A1 | 12/2016 | Cao |
| 2016/0364812 A1 | 12/2016 | Cao |
| 2016/0364823 A1 | 12/2016 | Cao |
| 2016/0371628 A1 | 12/2016 | Wilkinson |
| 2017/0011449 A1 | 1/2017 | Mueller et al. |
| 2017/0024804 A1 | 1/2017 | Tepfenhart, Jr. et al. |
| 2017/0046658 A1 | 2/2017 | Jones et al. |
| 2017/0116572 A1 | 4/2017 | Natarajan et al. |
| 2017/0124511 A1 | 5/2017 | Mueller et al. |
| 2017/0132558 A1 | 5/2017 | Perez |
| 2017/0213271 A1 | 7/2017 | Nelms et al. |
| 2017/0293881 A1 | 10/2017 | Narkulla |
| 2017/0313421 A1 | 11/2017 | Gil |
| 2017/0323258 A1 | 11/2017 | Semsey |
| 2017/0323545 A1 | 11/2017 | Gillen et al. |
| 2017/0352124 A1 | 12/2017 | Semsey et al. |
| 2018/0108062 A1 | 4/2018 | McHale et al. |
| 2018/0253691 A1 | 9/2018 | High et al. |
| 2018/0321679 A1 | 11/2018 | Nixon |
| 2018/0342007 A1 | 11/2018 | Brannigan et al. |
| 2018/0349849 A1 | 12/2018 | Jones et al. |
| 2018/0356823 A1 | 12/2018 | Cooper |
| 2018/0357848 A1 | 12/2018 | McLellan et al. |
| 2019/0066045 A1 | 2/2019 | Cantrell |
| 2019/0114583 A1 | 4/2019 | Ripert |
| 2019/0251541 A1 | 8/2019 | Etzion |
| 2019/0378081 A1 | 12/2019 | Schwartz |
| 2020/0342387 A1 | 10/2020 | Rajkhowa et al. |
| 2020/0410864 A1 | 12/2020 | Ripert |

OTHER PUBLICATIONS

NeighborShopper—Grocery Delivery By Your Neighbors, https://www.neighborshopper.com/, NeighborShopper, LLC, 8 pages (Copyright 2017).

Non-Final Office Action issued in U.S. Appl. No. 16/001,828, dated Oct. 2, 2020, 32 Pages (Target #201800350).

Notice of Allowance issued in U.S. Appl. No. 16/001,828, dated Jun. 1, 2021, 10 Pages (Target# 201800350).

Najafabadi, Shirin, "Designing an On-demand Dynamic Crowdshipping Model and Evaluating Its Ability to Serve Local Retail Delivery in New York City" 2019 ProQuest Dissertations Publishing ISBN: 9781392435250 (Year: 2301).

Non-Final Office Action issued in U.S. Appl. No. 16/001,828, dated Mar. 1, 2021, 17 Pages (Target # 201800350).

* cited by examiner

SYSTEM AND METHOD OF FACILITATING DELIVERY OF GOODS TO A CUSTOMER

TECHNICAL FIELD

The present disclosure relates generally to methods and systems for delivering goods from a retailer to a customer.

BACKGROUND

Last-Mile Delivery

Retailers are constantly looking for faster, more efficient ways to handle last-mile delivery to customers. Last-mile delivery refers to the movement of goods from a supply chain node to a final delivery destination. For many retailers, this final movement is between a distribution center or a retail store to a customer's residence. Customers have come to expect inexpensive and fast shipping of goods from retailers. Same day shipping has become a reality and grocery stores have also started to offer delivery services.

However, delivery to individual homes continues to be a problem because it is inefficient and expensive. For some retailers, many customers live within a short distance of a retail store, but those customers are unable to travel to the store to pick up orders or shop for goods. Some customers are homebound and cannot travel at all. Others are simply busy and would prefer to receive delivery of goods at their home.

Crowd-Sourced Delivery

One solution to the last-mile delivery problem is crowd-sourced deliveries. Many existing methods of crowd-sourced delivery exist. Many operate on a fee-based system where an individual is paid for completing tasks and deliveries. The customer pays a fee, part of which goes to the deliverer and part is kept by the company providing the delivery service.

One well known provider of such services is "Instacart." Crowd-sourced contractors shop for a customer's list of groceries at a local store. The groceries are then delivered to the customer during a scheduled window ("Scheduled") or within one to two hours ("On Demand") for a delivery fee.

Another crowd-sourced delivery service is called "Neighbor Shopper." Neighbors shop for each other when they are going to the grocery store. The neighbor doing the shopping is paid a fee from the neighbor receiving delivery of their groceries.

Many homebound individuals are on a limited budget and cannot afford to pay extra delivery fees for delivery of groceries or other needed items. More efficient methods of delivering goods for lower fees are needed.

SUMMARY

In summary, the present disclosure relates to methods and systems for delivering goods from a retailer to a customer. The methods and systems operate to facilitate coordination between individuals within the same geographic area to arrange for delivery of goods from a retail store. In some embodiments, individuals living within the same neighborhood as a homebound individual volunteer to pick up goods from a nearby retail store and deliver the goods to the homebound individual. In other embodiments, delivery drivers are paid to complete deliveries and the cost of delivery is borne either by the customer or the retailer.

In a first aspect, a computer-implemented method of facilitating delivery of goods to a customer user is described. A network of users is established based on a geographic area. The users includes a plurality of customer users and delivery users. The network is established by receiving requests from customer users and delivery users to join the network and validating residence addresses of the customer users and delivery users. A request is received at the computing system from a customer user computing device. The request includes a list of goods to be delivered to a customer user from among the plurality of customer users. Information is presented regarding the order and the customer user to delivery user computing devices within the network. The delivery user computing devices are associated with delivery users that have residence addresses within the same geographic area as the residence address of the customer user. A notification message is received at the computing system from a delivery user computing device indicating that one of the delivery users will pick up and deliver the goods to the customer user. A notification is transmitted to the customer user computing device indicating that the delivery user has accepted the request. The computing system receives a confirmation message of order pickup from the delivery user computing device. A delivery confirmation message is received at the computing system in real time from the customer user computing device or the delivery user computing device indicating that the requested goods have been delivered to the customer user.

In a second aspect, this disclosure describes a method of facilitating delivery of goods from a retail store to a customer user. A message is sent from a delivery user computing device. The message indicates that a delivery user associated with the delivery user computing device wishes to join a neighborhood delivery network. The neighborhood delivery network includes multiple delivery users and multiple customer users having residence addresses within the same neighborhood as the residence address of the delivery user. The delivery user computing device receives a message indicating that the delivery user has been accepted into the neighborhood delivery network. The message includes information identifying a neighborhood to which the delivery user belongs. Input is received from the delivery user indicating intent to travel to a retail store near the neighborhood. Information about one or more customer users located within the neighborhood that are requesting delivery of orders are presented on the delivery user computing device. A selection is received from the delivery user of an order associated with one of the customer users. A neighborhood delivery facilitation system sends a notification message that the delivery user will pick up the customer user's order from the retail store. The customer user's order information is received and a message indicating that delivery has been completed to the customer user is received. A delivery confirmation message is communicated to the neighborhood delivery facilitation system.

In another aspect, a method of ordering goods for delivery involves sending a message indicating that a customer user associated with a customer user computing device wishes to join a neighborhood delivery network. The neighborhood delivery network includes a plurality of customer users and a plurality of delivery user having residence addresses that are in the same neighborhood as a residence address of the customer user. A message is received at the customer user computing device indicating that the customer user has been accepted into the neighborhood delivery network. Input is received from the customer user requesting an order of goods to be delivered from a retail store. The customer user's order is communicated to a delivery facilitation server. A notification message is received from the delivery facilitation server indicating that one of the delivery users will pick up the customer user's order from the retail store. A confirmation message is received when the delivery user has picked up the order at the retail store. Input is received at the customer user computing device indicating that delivery has been completed to the customer user.

In yet another aspect, a delivery facilitation system is described useable to coordinate deliveries of goods from a retailer to a customer user. The delivery facilitation system includes a delivery facilitation server including a processor and a memory communicatively connected to the processor. The memory includes a user validation engine configured to receive user information and validate user locations within a geographic area. The memory also includes a request management engine configured to receive requests from customer user computing devices, where each request includes an order for delivery of goods from a retailer to a customer user at a location within the geographic area. The request management engine also presents requests to one or more delivery users within the same geographic area, and receives notifications from delivery user computing devices upon acceptance of a customer user's request. The memory also includes a confirmation engine configured to automatically generate confirmation messages upon successful delivery of a customer user's order.

DETAILED DESCRIPTION

Figure 1:
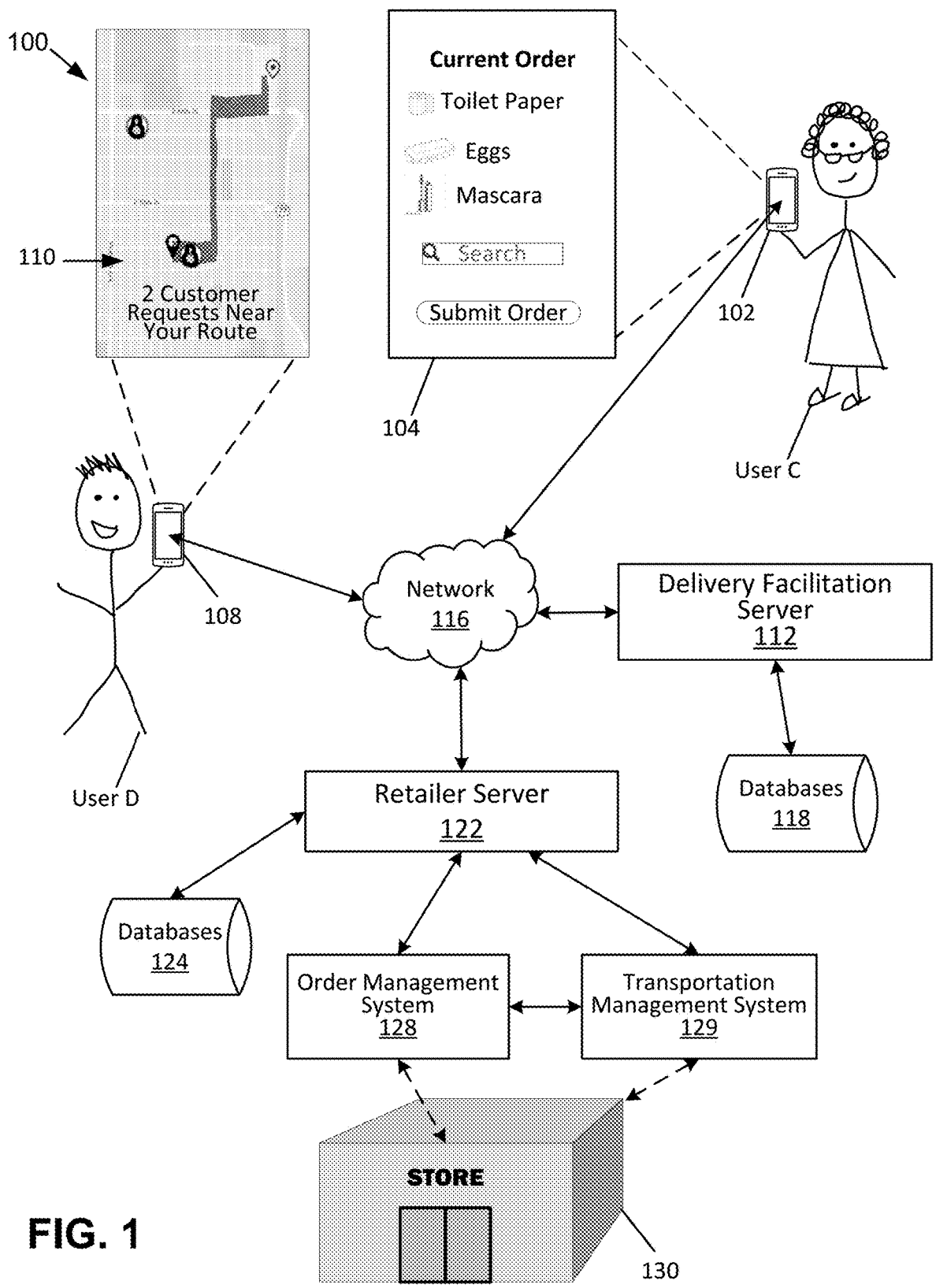
FIG. 1 illustrates a diagram of an example network and system for facilitating delivery of goods.

Systems and methods are described for facilitating delivery of goods from a retail location to a customer. The goods can be requested through a customer user computing device by either inputting a list of requested items or placing an online order for goods to be picked up. In some embodiments, the goods are prepared for pick up at a particular retail store location based on proximity to the customer user, availability of requested goods, and the time by which the user has requested the goods. In some embodiments, delivery users are required to go through a vetting process before they can complete deliveries.

In some embodiments, the goods are requested by a customer user who is a homebound person living in a particular neighborhood. A delivery user who also lives in the same neighborhood as the homebound person can agree to pick up and deliver the goods requested by the homebound person.

In other embodiments, the goods are requested by a customer user that is any individual desiring delivery within a particular timeframe. A delivery user agrees to pick up goods from a particular retail store and deliver the goods to individuals that are near the delivery user's anticipated route or destination.

In some embodiments, the delivery user merely needs to pick up an order from a retail store while the delivery user is doing his or her own shopping. The retailer prepares the requested goods for pickup and payment is handled through the online order placed by the customer user. In other embodiments, the delivery user receives the list of requested goods from the customer user and gathers the requested goods from the retail store. The delivery user checks out with the requested goods and conducts a transaction with the retail store to handle payment on behalf of the customer user. In some embodiments, the retailer may opt to hire independent contractor delivery services if a delivery user is not available to fulfill a customer request within the allotted time.

In some embodiments, the delivery user is paid a small fee for performing deliveries. The delivery fee may be paid by the customer user either directly or indirectly, through the retailer. In some instances, the retailer could bear some or all of the costs of delivery to reduce the cost to the customer.

In other embodiments, the delivery user earns rewards such as monetary rewards, gift cards, points, badges, or credit. In some embodiments, the delivery user agrees to deliver goods to a customer user simply because they want to do something nice for a neighbor or homebound person. In those instances, the delivery user can waive their delivery fee and pass the savings on to the customer user.

The system operates to coordinate deliveries and mediate communications between delivery users, customer users, and retailers. In some embodiments where a retailer has multiple locations, customer orders for delivery are received by the retailer's order management systems and allocated to the best location for fulfillment. Those deliveries become available for delivery users to accept based on which retail location the delivery user is shopping at or plans to travel to. The delivery user can select orders to accept based on proximity of the delivery address to the delivery user's anticipated route or destination. The delivery user can view and select orders to accept either before traveling to a retail location or while at the retail location.

The delivery user can perform the pickup and delivery as a point-to-point delivery (one order delivered to one destination from the retail location) or the delivery user can pick up multiple orders to drop off at multiple destinations if the drop offs can be performed within the time requested by all of the customer users.

If customer orders are not claimed for delivery in time for the goods to be delivered to customer users in fulfillment of their scheduled request, the deliveries can be allocated to either a local carrier or independent contractor delivery services.

Communications are also managed between users and retailers. Such communications can include notifications, messages, orders, and confirmations. The retailer can send notifications and confirmation when orders are ready for pick up. Delivery tracking is managed in part by the sending and receiving of confirmation messages at various steps in the delivery process such as accepting a delivery request, picking up an order, and delivering an order. In some embodiments, communications are automatically generated in real time.

The systems and methods described herein provide various technical advantages such as providing real time notifications to retailers and users. Notifications can be automatically generated at various points in the delivery process such as when orders are received at the retailer, when orders are ready for pickup at a retail location, when the orders have been picked up by a delivery user, and when orders have been successfully delivered to a destination.

The system and methods described herein also provide the benefit of automatically rewarding delivery users upon successful completion of deliveries.

The systems and methods described herein provide various technical advantages such as providing the ability to validate the pickup using scanned unique bar codes that capture the delivery users' information including the address. Delivery progress can be confirmed at order pick up and order drop off using the unique identifiers. In some embodiments, blockchain technology is utilized to record the delivery times and other confirmation messages.

Referring now to FIG. 1, an example system 100 is shown that is useable to implement a method of coordinating deliveries of goods from at least one retail store to one or more customers. In the example system 100 shown, a customer user C operates a computing device 102, such as a smartphone or other network-enabled device, having a display 104. A delivery user D operates another computing device 108 having a display 110. The customer user's computing device 102 communicates with the delivery user's computing device 108 through the network 116. The computing devices 102, 108 are further described in FIG. 2.

The computing devices 102, 108 also communicate with a delivery facilitation server 112 and at least one retailer server 122 through the network 116. The delivery facilitation server 112 operates to match customer users with delivery users within the same geographic area for the purposes of coordinating deliveries of goods from a store. The delivery facilitation server 112 communicates with one or more databases 118 to establish a network of delivery users and customer users. The network is established based on a geographic area. In some embodiments, the network is established based on geographic proximity of the delivery users and customer users to each other. In other embodiments, the network is established based primarily on delivery user's locations and locations of retails stores. The deliveries can be coordinated based on the delivery person's current physical location, inclusive of proximity to a retail store, the delivery user's destination zip code, and delivery orders in that zip code, nearby zip codes, or in a location between the retail store and the delivery person's final destination.

The delivery facilitation server 112 also functions to validate which users have opted into the network, indicating a desire to provide delivery services or to receive deliveries of goods. The delivery facilitation server 112 can further operate to vet delivery users to ensure that they are properly licensed to drive, pass background checks, etc. The delivery facilitation server 112 further manages coordinating orders from customer users with willing delivery users to ensure that customer users receive deliveries of their goods in a timely manner. The delivery facilitation server 112 communicates the details of the customer user's requests to the delivery users. The delivery facilitation server 112 is further described in FIG. 4.

The retailer server 122 operates in conjunction with the delivery facilitation server 112 by communicating through the network 116. The retailer server 122 determines if the goods requested in the order are in stock. The retailer server 122 can also instruct employees of the store to prepare the items for pick up. The retailer server 122 communicates with an order management system 128 to send and receive confirmations of placement of an order and pick up of an order at the store 130. The retailer server 122 may access one or more databases 124 containing information such as payment information, store stock information, and online order information. The order management system 128 can communicate additional information to the retailer server 122 which then communicates the information to the delivery facilitation server 112, such as the pickup of individual items at the store 130, to validate that the order is being filled correctly, or to validate payment for the items, etc.

The retail server 122 and order management system 128 may also communicate with a transportation management system 129 to coordinate deliveries for customer users. In some embodiments, the transportation management system 129 will operate to coordinate alternative delivery methods to ensure that customer user requests are fulfilled in a timely manner. The retailer server 122, order management system 128, and transportation management system 129 are further described in FIG. 3.

Figure 2:
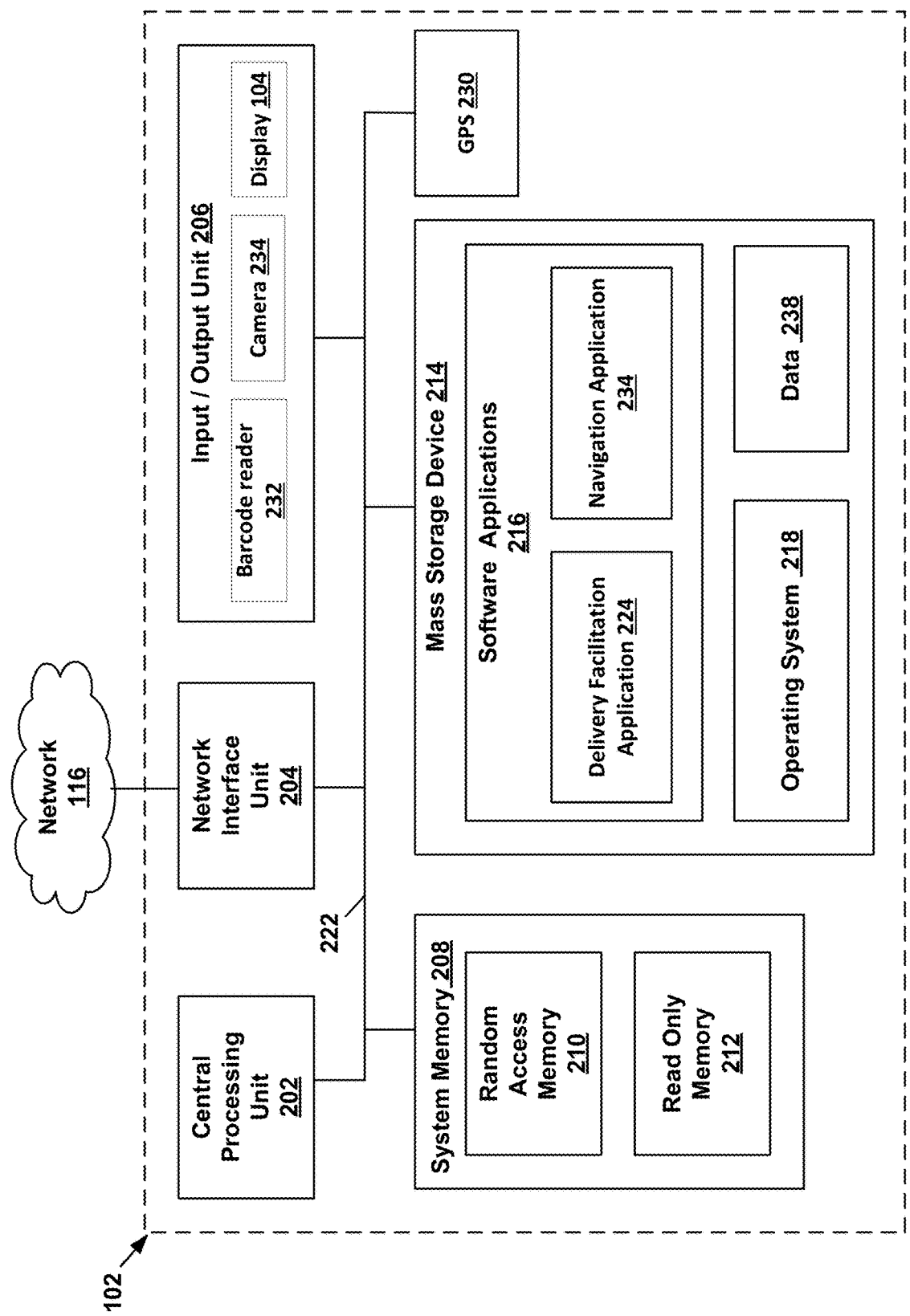
FIG. 2 illustrates an example block diagram of a user computing device useable in the context of FIG. 1.

FIG. 2 illustrates a more detailed block diagram of a user computing device 102 that is usable to implement aspects of the system 100 of FIG. 1. In the example of FIG. 1, the user computing device 102 is operated by a customer user C. However, the components of the customer user's computing device 102 may be interchangeable with those of the delivery user's computing device 108. While the computing devices 102, 108 may perform slightly different functions depending on which type of user is operating the device, such devices could generally be operated by a customer user to place orders or by a delivery user to receive requests and deliver orders.

In the embodiment shown, the computing device 102 includes at least one central processing unit ("CPU") 202, a system memory 208, and a system bus 222 that couples the system memory 208 to the CPU 202. The system memory 208 includes a random access memory ("RAM") 210 and a read-only memory ("ROM") 212. A basic input/output system that contains the basic routines that help to transfer information between elements within the computing device 102, such as during startup, is stored in the ROM 212. The computing device 102 further includes a mass storage device 214. The mass storage device 214 is able to store software instructions and data.

The mass storage device 214 is connected to the CPU 202 through a mass storage controller (not shown) connected to the system bus 222. The mass storage device 214 and its associated computer-readable storage media provide non-volatile, non-transitory data storage for the computing device 102. Although the description of computer-readable storage media contained herein refers to a mass storage device, such as a hard disk or solid state disk, it should be appreciated by those skilled in the art that computer-readable data storage media can include any available tangible, physical device or article of manufacture from which the CPU 202 can read data and/or instructions. In certain embodiments, the computer-readable storage media comprises entirely non-transitory media.

Computer-readable storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the computing device 102.

As mentioned briefly above, the mass storage device 214 and the RAM 210 of the computing system 200 can store software instructions and data. The software instructions include an operating system 218 suitable for controlling the operation of the computing system 200. The mass storage device 214 and/or the RAM 210 also store software instructions, that when executed by the CPU 202, cause the computing device 102 to provide the functionality of the computing system 200 discussed in this document. For example, the mass storage device 214 and/or the RAM 210 can store software instructions that, when executed by the CPU 202, cause the computing device 102 to receive and send order requests and delivery confirmations.

In the example of FIG. 2, the mass storage device 214 includes at least a delivery facilitation application 224 and a navigation application 234. The delivery facilitation application 224 operates to send and receive requests for delivery of goods from a store. The delivery facilitation application 228 accesses a GPS unit 230 to determine a current location of the computing device 102. The delivery facilitation application 224 also accesses data 238 that is provided in delivery requests such as a customer user's delivery address (home address), membership in particular neighborhoods, memberships associated with a retailer, profile information, ordering preferences, and payment information. For delivery users, the data 238 may include profile information, a location associated with the delivery user (home address), membership in particular neighborhoods, status as a delivery user, ratings as a delivery user, and banking information (for receiving payments). The functionality of the delivery facilitation application 224 is further described in relation to FIG. 6.

The navigation application 234 operates in conjunction with the delivery facilitation application 224 to direct a delivery user to a destination. In some embodiments, the delivery user D could indicate an intent to travel from a store to a customer user's home. The delivery facilitation application 248 could then interface with the navigation application 234 to display turn-by-turn directions to the delivery user D in order to travel to the customer user C to make a delivery of goods. The navigation application 234 operates in conjunction with the GPS device 230 to determine the real time location of the computing device 102.

The input/output unit 206 includes at least a display 104. The display 104 provides a visual representation of the delivery facilitation application 228 to the user. In some instances, a delivery user can view the display 104 to determine which items a customer user C has requested to be delivered. In other instances, the display 104 can include a barcode or other symbol that can be scanned to confirm that a particular interaction has taken place.

The input/output unit 206 can include one or more additional input and/or output devices and capabilities. For example, a barcode reader 232 or camera 234 could be used to confirm that an event has occurred. For example, a bar code on a smartphone, a receipt, or an item could be scanned to validate, confirm, or notify at various steps of the delivery process. Other input devices can include a mouse, a keyboard, a touch screen, a microphone, and a biometric scanner.

Figure 3:
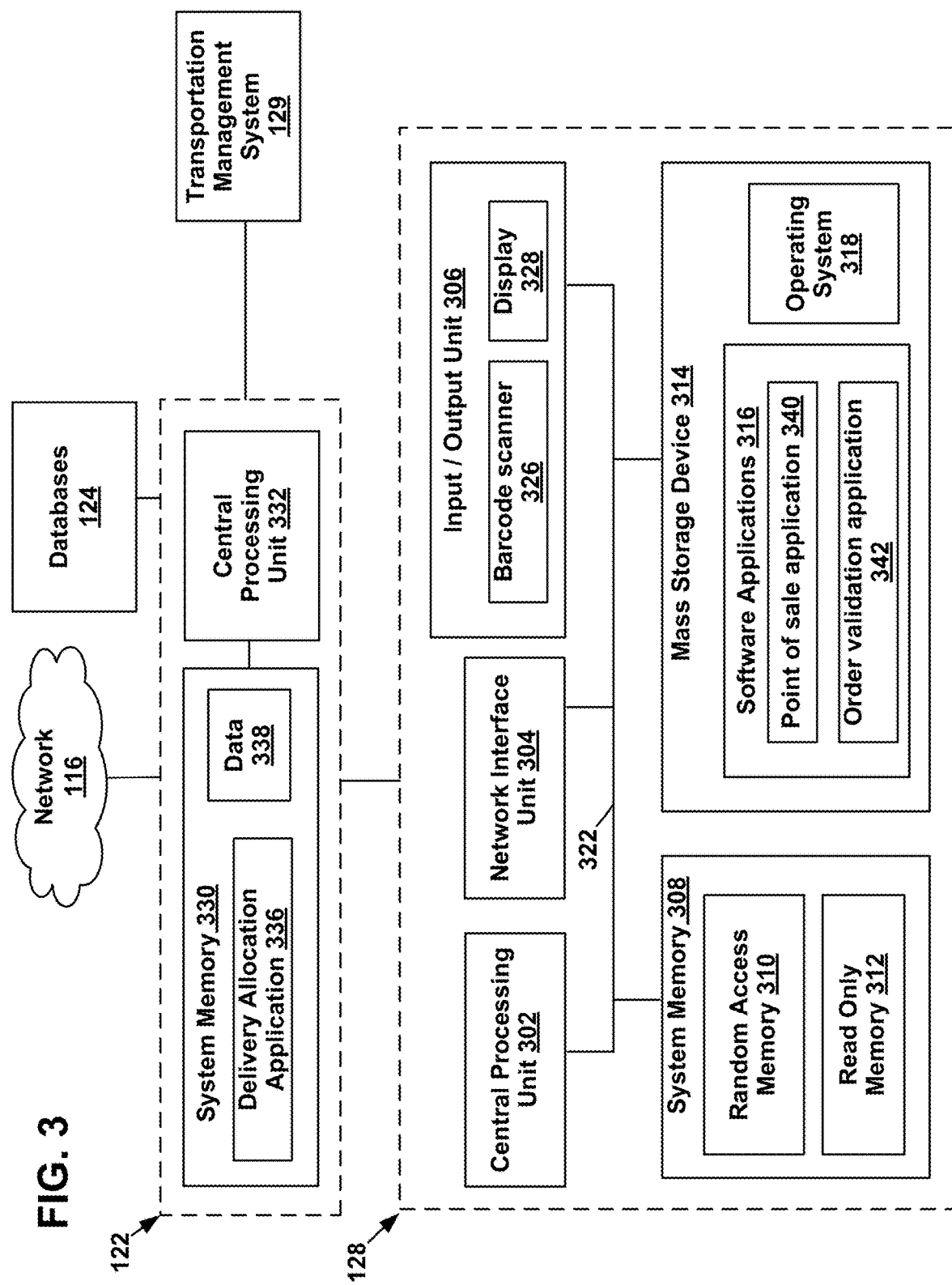
FIG. 3 illustrates an example block diagram of a retailer computing system useable in the context of FIG. 1.

FIG. 3 illustrates a more detailed block diagram of the retailer server 122 and order management system 128 that are usable to implement aspects of the system 100 of FIG. 1. The order management system 128 is generally operated by an employee of a retail store to look up orders, execute sales to customers, and manage orders for goods that are to be picked up from the store. In some embodiments, the order management system 128 also handles customer orders that are placed to be fulfilled in methods other than in-store pickup. The retailer server 122 operates to receive online orders, record sales, validate the identity of delivery users and prepared orders at the time of pickup, and confirm that pickups have taken place.

In the embodiment shown, the retailer server 122 includes at least a system memory 330 and a central processing unit 332. The system memory 330 includes software such as a (software to handle pickup confirmations, etc.) 336 that is executed by the central processing unit 332. The system memory 330 can also include data 338. The data 338 can include inventory updates, stored reviews for users, stored information regarding user rewards accounts, etc. The data 338 can also include sales details such as: order date, order number, quantity, paid price, discounts applied, TCINs and the particular child variation details (color, size). Delivery user details can be included such as: address, name, rating, and digital signature. Customer user data such as name, member ID, address, order history, and signatures can be included as well.

The retailer server 122 may communicate with one or more store databases 124. The store database 124 can include data for sales details and product information. The retailer server 122 also communicates with one or more order and purchase management systems such as the order management system 128 shown as well as transportation management systems such as the transportation management system 129 shown.

The transportation management system 129 operates to optimize the method of delivery used to transport goods from retail locations to customer users. Customer orders are assigned to retail locations and mode of delivery to optimize speed, cost, and other shipping factors. In some instances, the transportation management system 129 can determine that same day delivery by delivery users is not necessary and allocates orders to other transportation modes. In cases where delivery users are not available to deliver orders to customers, the transportation management system 129 reassigns orders to other transportation means that will enable goods to be delivered to customers within the promised window of time.

In the embodiment shown, the order management system 128 includes at least one central processing unit ("CPU") 302, a system memory 308, and a system bus 322 that couples the system memory 308 to the CPU 302. The system memory 308 includes a RAM 310 and a ROM 312. The order management system 128 further includes a mass storage device 314 that stores software instructions and data. The order management system 128 also includes an input/output unit 306.

In this embodiment, the input/output unit 306 includes at least a barcode scanner 326 and a display 328. The barcode scanner 326 is utilized to scan barcodes of items to execute sales and also to scan barcodes on a user's computing device display to locate orders for pickup. Other barcodes may be scanned from receipts, driver's licenses, and labels. In some embodiments, orders that are ready for pickup will be packaged in a bag with a receipt or label affixed which includes a barcode In the example of FIG. 3, the mass storage device 314 includes software applications 316 and an operating system 318. The software applications 316 include at least a point of sale (POS) application 340 that operates to execute sales in the store. The POS application 340 transactions between the retailer and the delivery user for picking up orders for customer users. An order validation application 342 may also be included which operates to validate the identity of the delivery user, identify orders that are assigned to the delivery user for pickup, and ensure that the correct items are being picked up for delivery to customer users.

Figure 4:
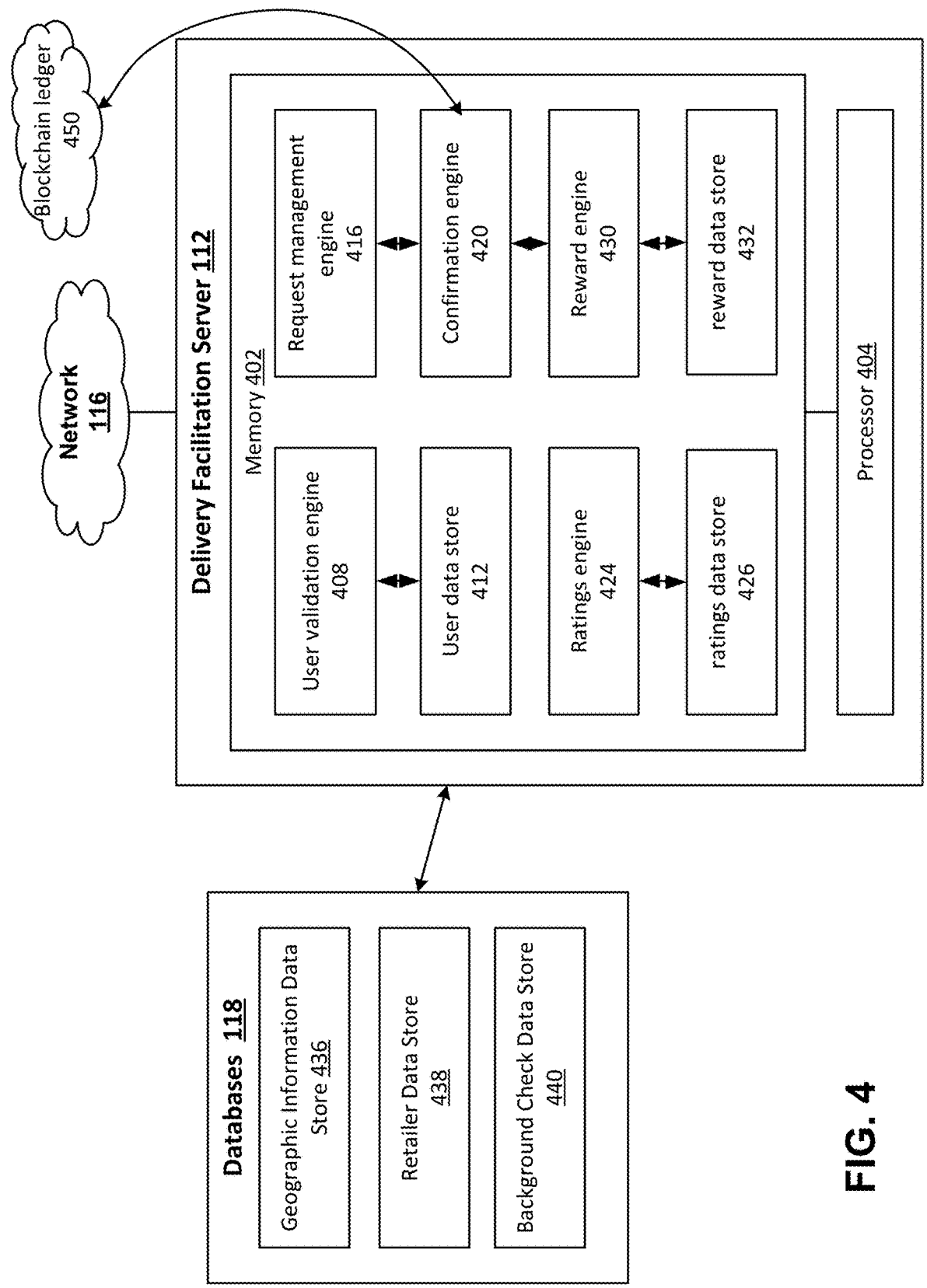
FIG. 4 illustrates an example block diagram of a delivery facilitation server useable in the context of FIG. 1.

FIG. 4 illustrates a more detailed block diagram of the delivery facilitation server 112. The delivery facilitation server 112 communicates with other parts of the system 100 through the network 116. The delivery facilitation server 112 includes at least a memory 402 and a processor 404 operatively connected to the memory 402. The processor 404 operates to execute instructions stored in the memory 402.

Figure 6:
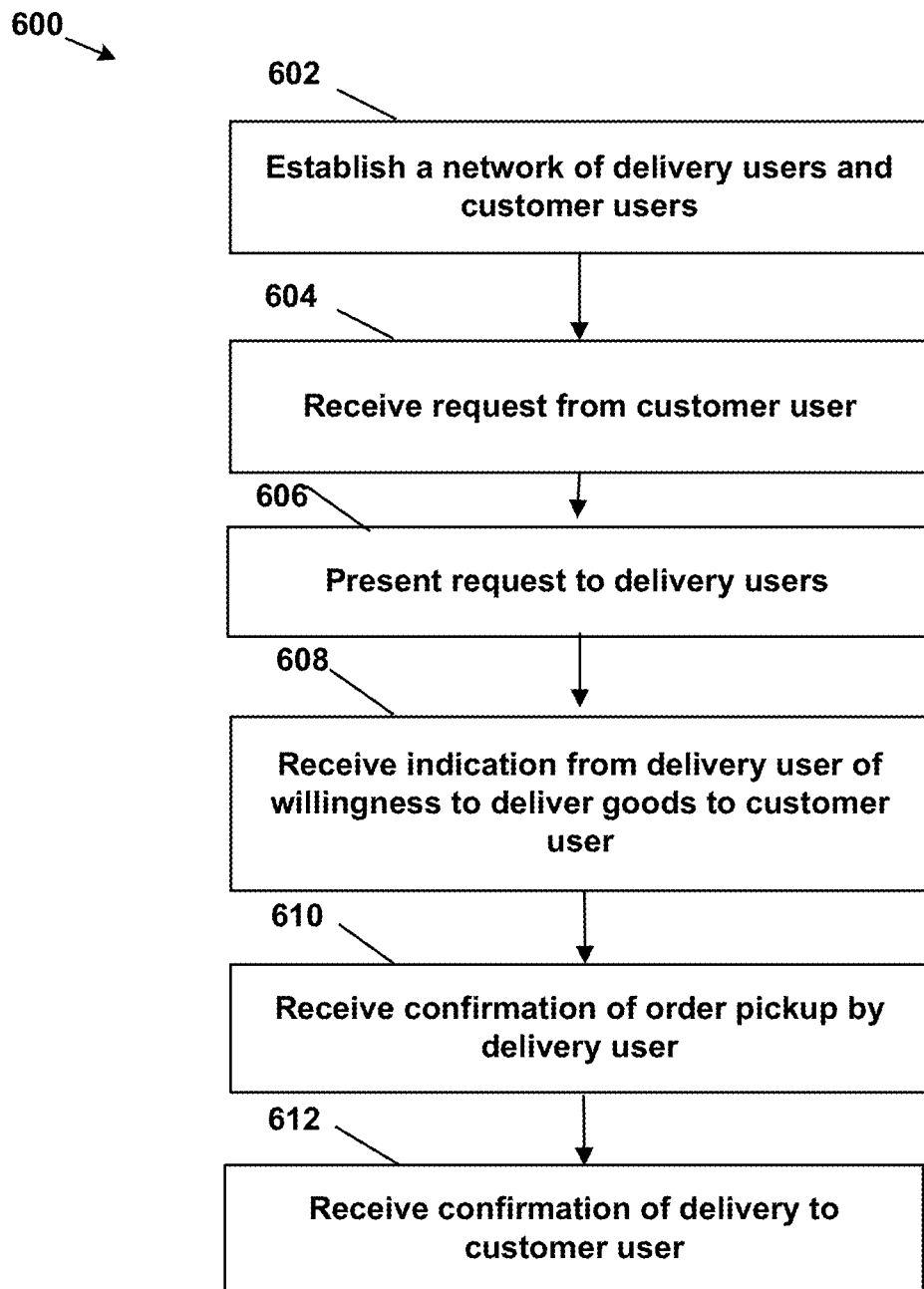
FIG. 6 illustrates an example flow chart of a method of facilitating delivery of goods performed by embodiments of the system of FIG. 1.

The memory 402 includes software engines for providing the functionality of the delivery facilitation method described in FIG. 6. Additionally, data is stored in the memory 402 usable to implement the method of delivery facilitation.

A user validation engine 408 operates to enroll new users into a delivery service. Information is gathered from users through user computing devices such as the computing devices 102, and 108 described in FIG. 1. Information about each user is stored in the user data store 412.

In some embodiments, the user validation engine 408 operates to opt-in users to a network of users defined by a geographic area. In some embodiments, the users are validated based on their geographic location, such as a residential address. The user's inclusion in a network may be based on neighborhoods that are accessed from a neighborhood data store 410. In some embodiments, neighborhoods could be based on neighborhoods as defined by social media applications such as NextDoor or Facebook Marketplace.

In other embodiments, users are enrolled to be customer users by logging into an account and providing a delivery address. Delivery users are enrolled after a vetting process to determine that they have proper insurance, licenses, and background checks. This process is further described in FIGS. 31-32.

A request management engine 416 receives requests from customer users and manages the communication of those requests to delivery users and retailers. The request management engine 416 may communicate with a retailer data store 418 to determine which items are available at a given store at a given time.

The request management engine 416 also communicates with a confirmation engine 420. The confirmation engine 420 receives inputs indicating that particular steps of the delivery facilitation process have been completed. For example, the confirmation engine 420 may receive inputs from users indicating that a delivery has taken place. This confirmation is communicated to the request management engine 416 to indicate that a request has been completed.

The confirmation engine 420 can store events such as pick up or delivery confirmations in a blockchain ledger 450; other events, such as rewards to the delivery user, could be stored as well. The use of blockchain creates a secure, infallible record of events. In some embodiments, a time stamp is recorded in the blockchain ledger 450.

The ratings engine 424 may optionally receive rating information from user computing devices to rate interactions that take place between delivery users and customer users. The ratings are saved to a ratings data store 426. Ratings are based on network effect with crowd input. The delivery users can rate the customer users and vice versa. One example of a rating scale could be 1-5 where, for example, 5 stars indicates an exceptional experience. Other rating systems are possible.

In some embodiments, objective ratings are recorded for deliveries in addition to the subjective ratings that are provided by the users. Objective ratings may be based on metrics such as on time delivery, delivering a correct order, or number of deliveries completed.

The reward engine 430 may optionally be included in the memory 402 and operates to send rewards to delivery users. In some instances, the reward engine 430 communicates notifications to delivery user computing devices indicating that the delivery user has earned a reward. For example, a delivery user could be provided with monetary compensation following the completion of a delivery to a customer user. Alternatively, discounts (e.g. 10 deliveries earn a 5% discount), points, coupons, store credit, and other rewards may be awarded to delivery users. Other rewards can come directly from a retailer and may include special access to early releases of products, exclusive deals, being featured on the retailer website, or invitations to special events hosted by the retailer. In some embodiments, volunteer delivery users complete deliveries without any reward or payment because the delivery is being made for a neighbor.

The reward engine 430 receives confirmations of delivery from the confirmation engine 420, and records the awarding of a reward to a delivery user in the reward data store 432. The reward engine 430 receives confirmations of delivery from the confirmation engine 420, and records the awarding of a reward to a delivery user in the reward data store 432. In some embodiments, the delivery user automatically receives rewards upon completion of a delivery. Information in the reward data store 432 could also be stored in a blockchain ledger 450.

Figure 5:
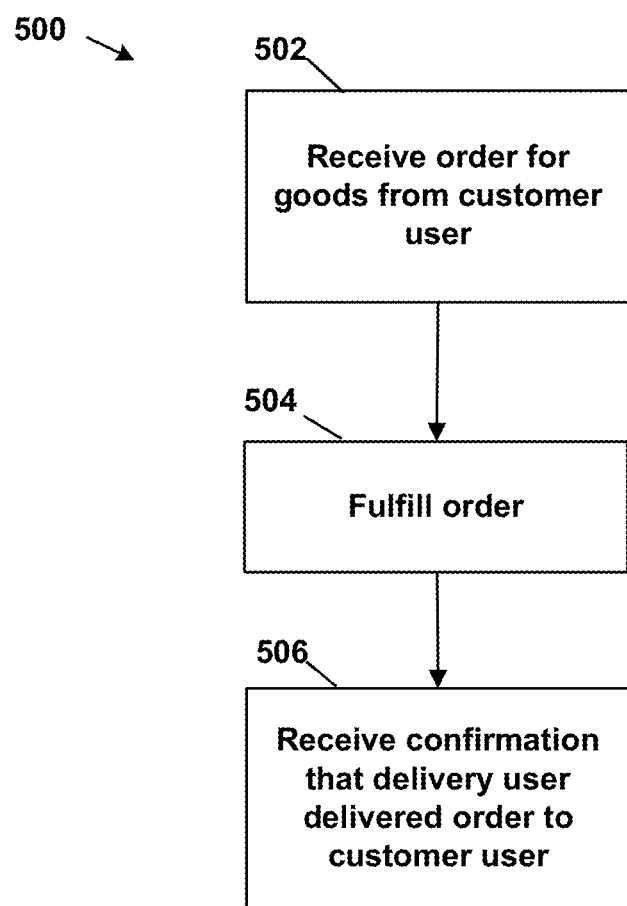
FIG. 5 is a flow chart of a general method of facilitating delivery of goods from a retailer to a customer.

FIG. 5 illustrates a flow chart of a general method 500 of facilitating delivery of goods to a customer. In some embodiments, this method 500 may be implemented by the delivery facilitation server 112 in conjunction with the system 100 of FIG. 1. More detailed versions and examples of the method 500 are described in relation to FIGS. 6-30.

At operation 502, an order for goods is placed by a customer user using a customer user computing device 102 associated with the customer user. The order is received at the delivery facilitation server 112 of FIG. 1. The order includes a request for one or more items from a retailer for delivery within a particular timeframe. In some embodiments, the delivery is requested for the same day. The order also includes a destination address for the goods to be delivered to.

At operation 504, the customer's order is fulfilled. The requested goods are picked and packaged for delivery at a retail location selected by the delivery facilitation server 112. In some embodiments, a confirmation message is sent to the customer user computing device when the order is received and when the order has been fulfilled. A delivery user is selected to deliver the order to the user. In some embodiments, the delivery user is selected based on a current or anticipated location of the delivery user computing device. GPS can be used to determine a current location. Input received at the delivery user computing device can be used to determine an anticipated location.

At operation 506, the delivery user picks up the order and delivers the order to the customer user. There may be an optional confirmation issued after the order has been picked up and after delivery is complete. In some embodiments, the delivery user is also a customer of the retailer. In some embodiments, the delivery user is paid by the retailer.

FIG. 6 illustrates an example method of facilitating delivery of goods to a customer user where the delivery user is a volunteer from the same neighborhood as the customer user. In some instances the customer user may be a person that cannot easily travel to a store to pick up their own groceries or other goods. The delivery user lives in the same neighborhood or general geographic area as the customer user and could easily pick up an order of goods while going to the retail store. The delivery user can volunteer to deliver an order to a customer user as a favor. In other embodiments, the delivery user may receive a small fee or reward for delivering orders to their neighbor.

At operation 602, a network of delivery users and customer users is established. In some embodiments, both customer users and delivery users have to opt-in to participate in the delivery service process. Requests are received from customer user computing devices and delivery user computing devices to join the delivery network.

The residential addresses of both the customer users and delivery users is validated before the users can participate in the delivery network. In some embodiments, enrollment in a social network such as NextDoor facilitates the validations of addresses. In such embodiments, the neighborhoods are established based on the neighborhoods defined by the social network. In other embodiments, the neighborhoods could be defined by fire zones and the like. In some embodiments, messages indicating that the user has been accepted into neighborhood delivery network are sent to the user computing device or delivery user computing device after the validation process is complete.

In some embodiments, users opt-in to a delivery facilitation service by first joining a service provided by a neighborhood software application provider. The neighborhood software application provider validates the home addresses of users and categorizes the users into neighborhoods. The neighborhoods are typically based on established neighborhood boundaries, but may also be based on fire zones or other boundaries. After joining the neighborhood through the software provider's service, the users can opt-in to be delivery users or customer users as part of a network of crowd-sourced delivery services.

At operation 604, a request is received at a computing system, such as the delivery facilitation server 112 of FIG. 1. The request is received from a first user computing device at a first geographic location within a geographic area. In some embodiments, the first user computing device is operated by a customer user. In some embodiments, the first geographic location is a residence of the customer user. In some embodiments, the geographic area is the neighborhood in which the customer user resides. In some aspects, the request includes an order for delivery of goods from a retailer to be delivered to the customer user. The order can include a list of requested items, such as a grocery list. In some embodiments, the order is an online order for goods that is placed directly with a retail store for pick up.

Figure 7:
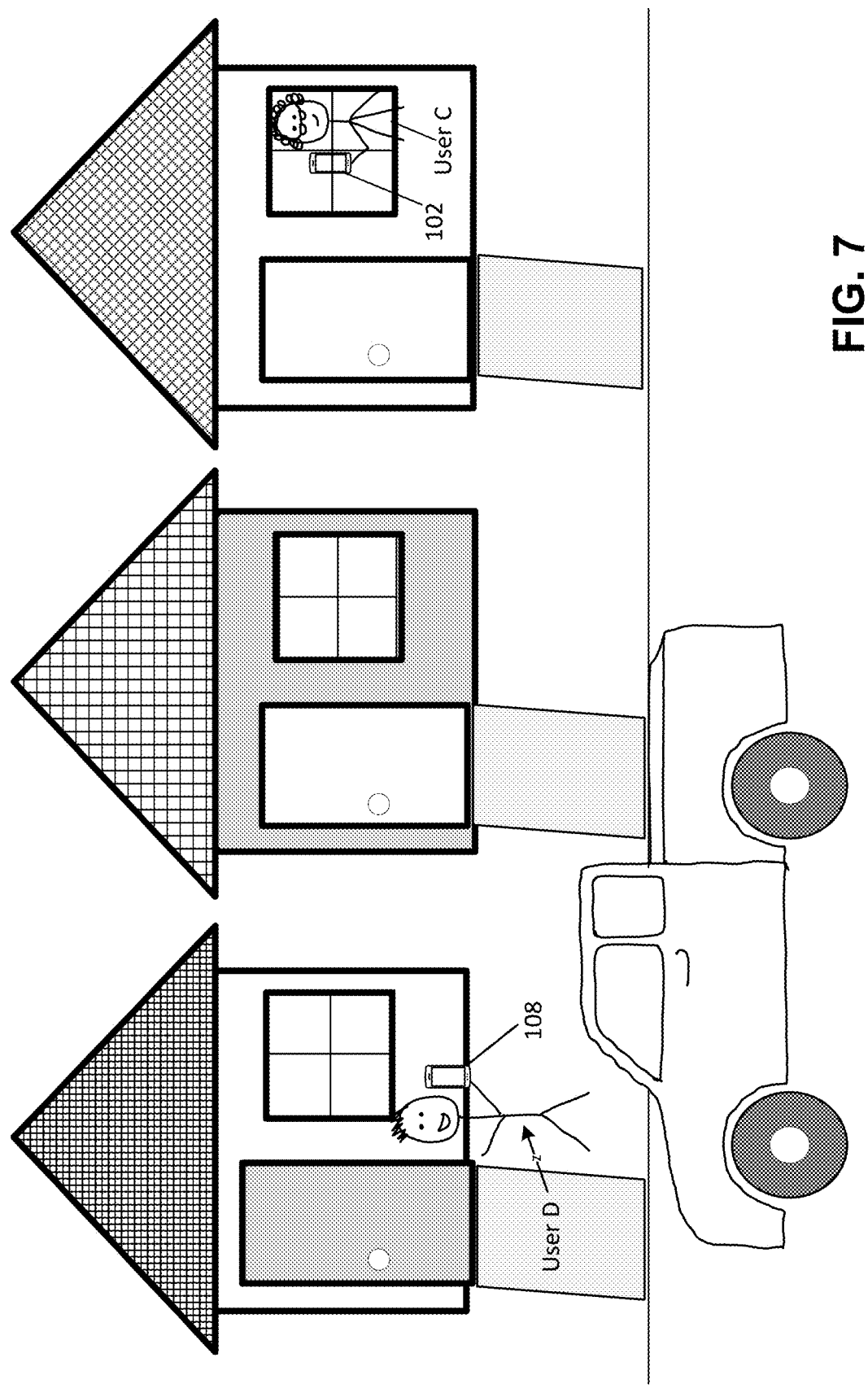
FIG. 7 illustrates an example neighborhood in which a method of facilitating delivery of goods is performed by the user computing device of FIG. 2.
Figure 8:
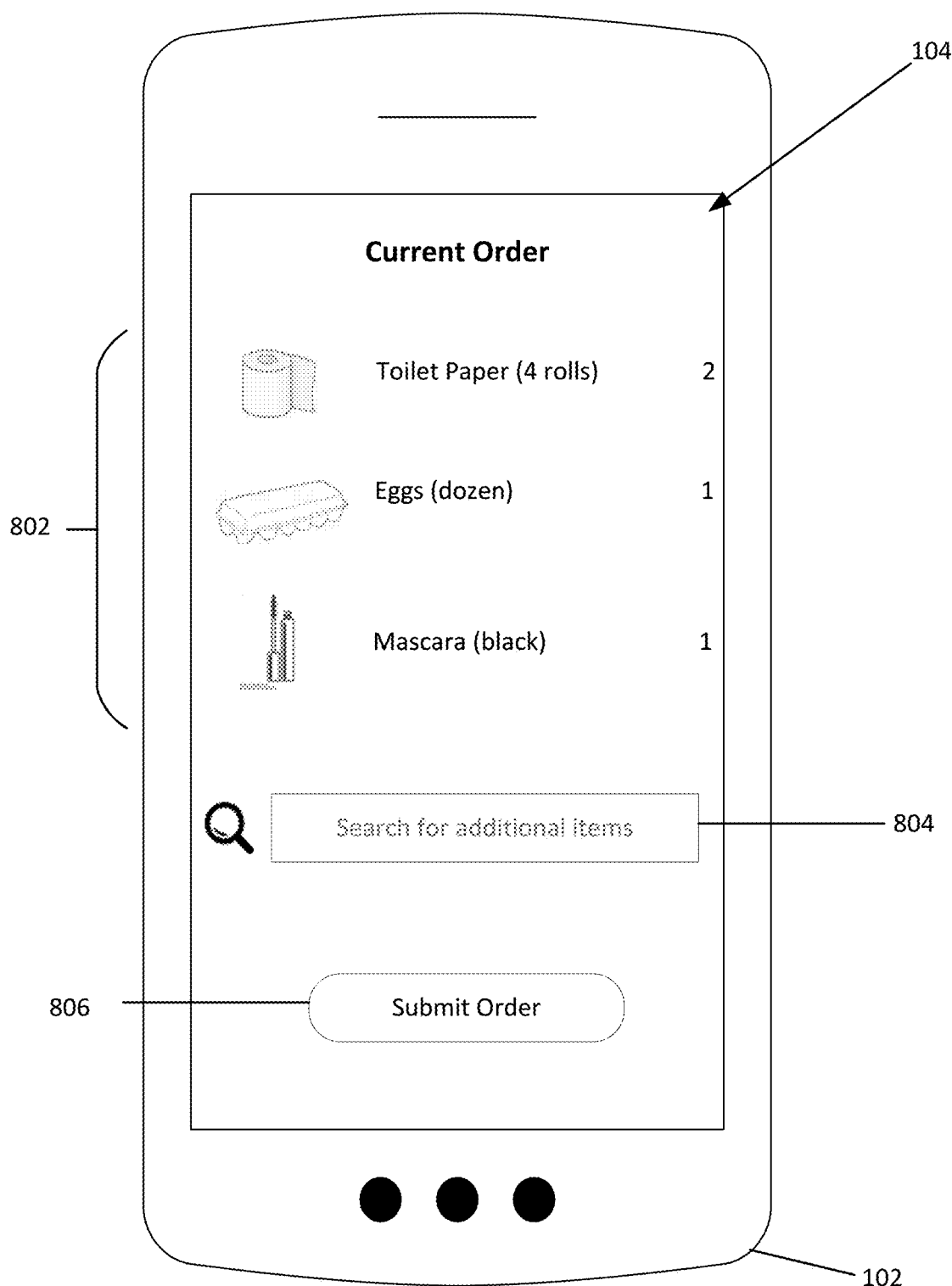
FIG. 8 illustrates an example embodiment of a user request display on the user computing device of FIG. 2.

FIGS. 7-8 illustrate an example situation in which a delivery request is being made by a customer user. In this example, the customer user C is a homebound individual who lives two doors down from a friendly delivery user D, who is going to the store. Customer user C places an order on her computing device 102, here a smartphone. An example display 104 shown in FIG. 8 illustrates an example request that may be placed on customer user's computing device 102.

In the example of FIG. 7, the delivery user D accesses his computing device 108 before traveling to the store to see if any of his neighbors need to have items picked up from the store. In other embodiments, the delivery user D may check for available deliveries upon arriving at a retail store or at other times before traveling to or leaving a retail store. The customer user C happens to be submitting an order now.

FIG. 8 illustrates an example view of a display 104 on a customer user's computing device 102 for placing an order. In this view, the customer user C has placed a number of item requests 802 in the order. A search box 804 is shown which would allow the customer user C to search for additional items. In alternative embodiments, items could be found by browsing categories of items. By selecting the "Submit Order" button 806, the customer user C submits the order. Additional order screens may include options for selecting a delivery timeframe and submitting payment. In some embodiments, even if the customer user does not specify a delivery timeframe, the order may have an automatically determined date and time by which it must be filled.

In other embodiments, the request includes a list of goods that the customer user needs to have delivered from the retail store. The list of goods is sent to a delivery user who is to pick out the items in the retail store, check out, and then deliver the requested items to the customer user. In some cases the customer user arranges for payment of the order directly through the retail store and the delivery user simply needs to provide a method of order confirmation to pick up the items. In other cases the delivery user purchases the items and then is reimbursed by the customer user.

Returning to FIG. 6, at operation 606 information about the request is presented to one or more delivery user computing devices. The information includes information about the order placed by the customer user and the customer user's geographic location.

The delivery users are selected based on their proximity to the customer user making the request or based on the customer user's delivery location being near the delivery user's intended destination or route. In some embodiments the delivery users' computing devices or registered home addresses are within a predetermined radius of the customer user. In other embodiments, the delivery users' computing devices or registered home addresses are within the same neighborhood as the customer user.

The request information can include the items requested by the customer user, information about the customer user's identity, rating information about the customer user, and the like. In some embodiments, the customer user select a delivery speed or delivery window. This could indicate that the customer user wants to receive the order immediately (within 1-2 hours), soon (within 2-4 hours), today, or within the next few days. The delivery speed may affect which delivery users are presented with the option to deliver the customer user's order.

Figure 9:
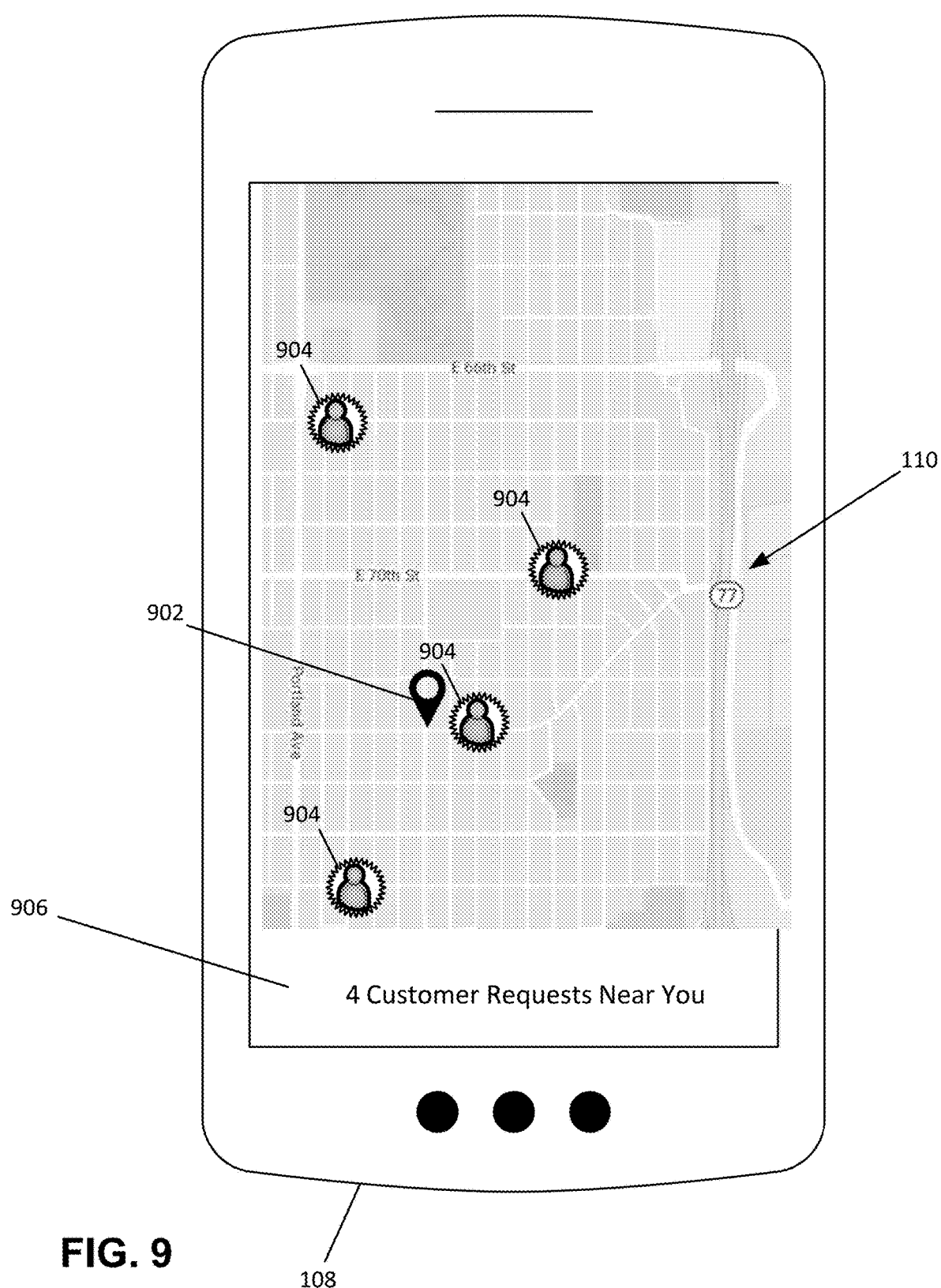
FIG. 9 illustrates an example embodiment of a delivery user display on the user computing device of FIG. 2.

FIG. 9 illustrates an example display 110 presented on a delivery user computing device 108. In this example, the delivery user D has accessed a smartphone application in anticipation of traveling to a retail store. The display 110 shows icons 904 representing customer users that have requested delivery of goods positioned on a map in relation to the delivery user's location 902. The customer requests are summarized in a request display 906. The delivery user D can select one of the customer user icons 904 to display information about that customer user's order.

In example embodiments, the requests that are presented in the request display 906 are limited to requests from customer users who are within the same geographical area as the delivery user. For example, the customer user and delivery user may have registered on a server with a residence address or delivery address within a same geographical region (e.g., neighborhood, ZIP code, or predetermined distance from one another).

Figure 10:
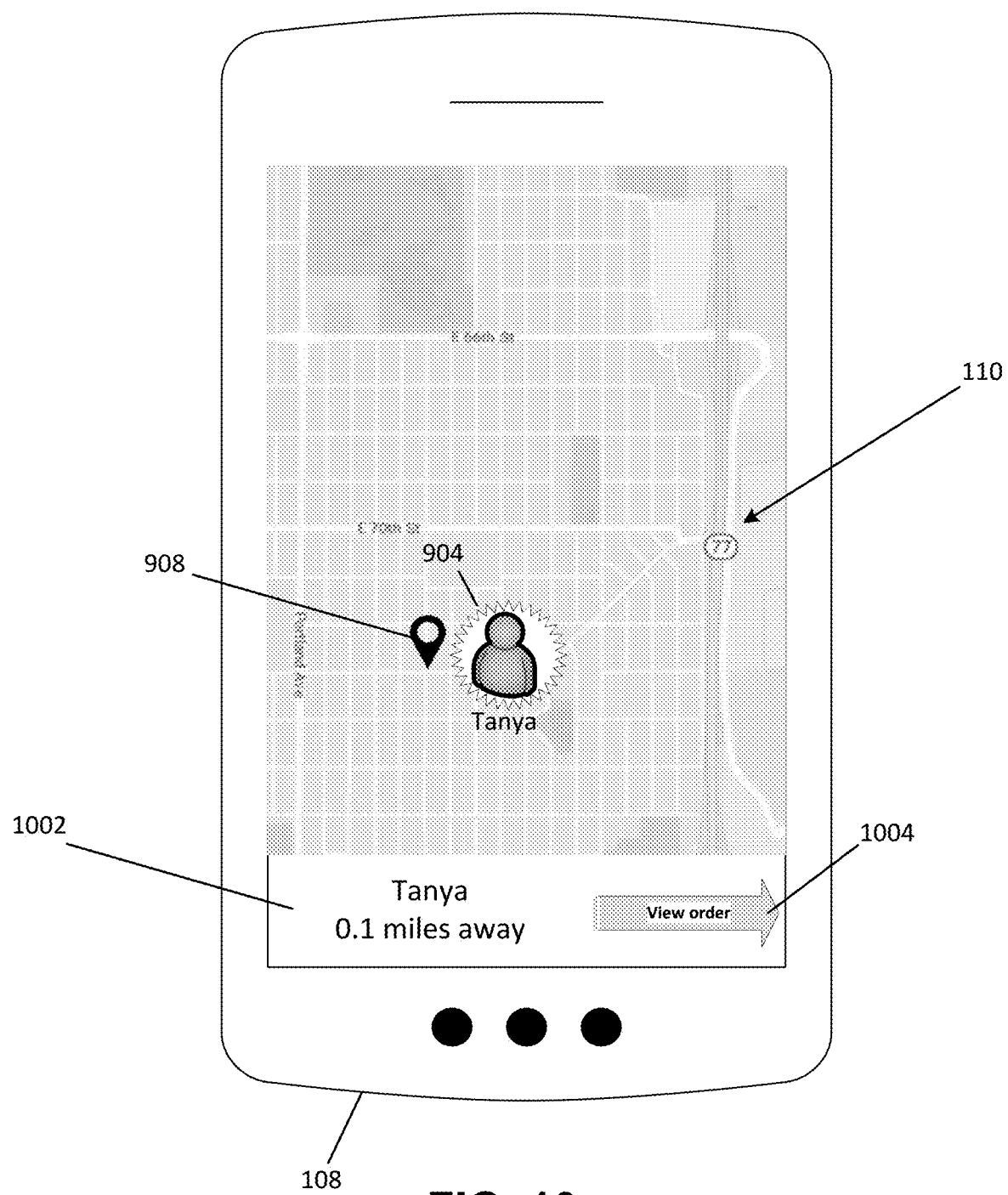
FIG. 10 illustrates another example embodiment of a delivery user display on the user computing device of FIG. 2.

FIG. 10 illustrates an example display 110 on the delivery user D's computing device 108 after selection of a particular customer user C. The customer information display 1002 shows the name of the customer making the request (Tanya) and the distance the customer is from the delivery user (0.1 miles). The delivery user can select the "View Order" button 1004 to see further details about the customer's order.

In cases where the customer user's order is an online order, the delivery user receives an order confirmation number, barcode, or other indication of which order to pick up from the retail store. In cases where the customer user's order is a list of items, the delivery user receives the list of items. In some embodiments, the list is a checklist displayed on the delivery user's computing device. In some embodiments, the list can include descriptions of where each item is located within the retail store. In some embodiments, the delivery user can scan a barcode on each item of the list to confirm that the correct item has been selected. In such embodiments, a confirmation message that the correct item has been selected may be communicated to the neighborhood software application provider.

Figure 11:
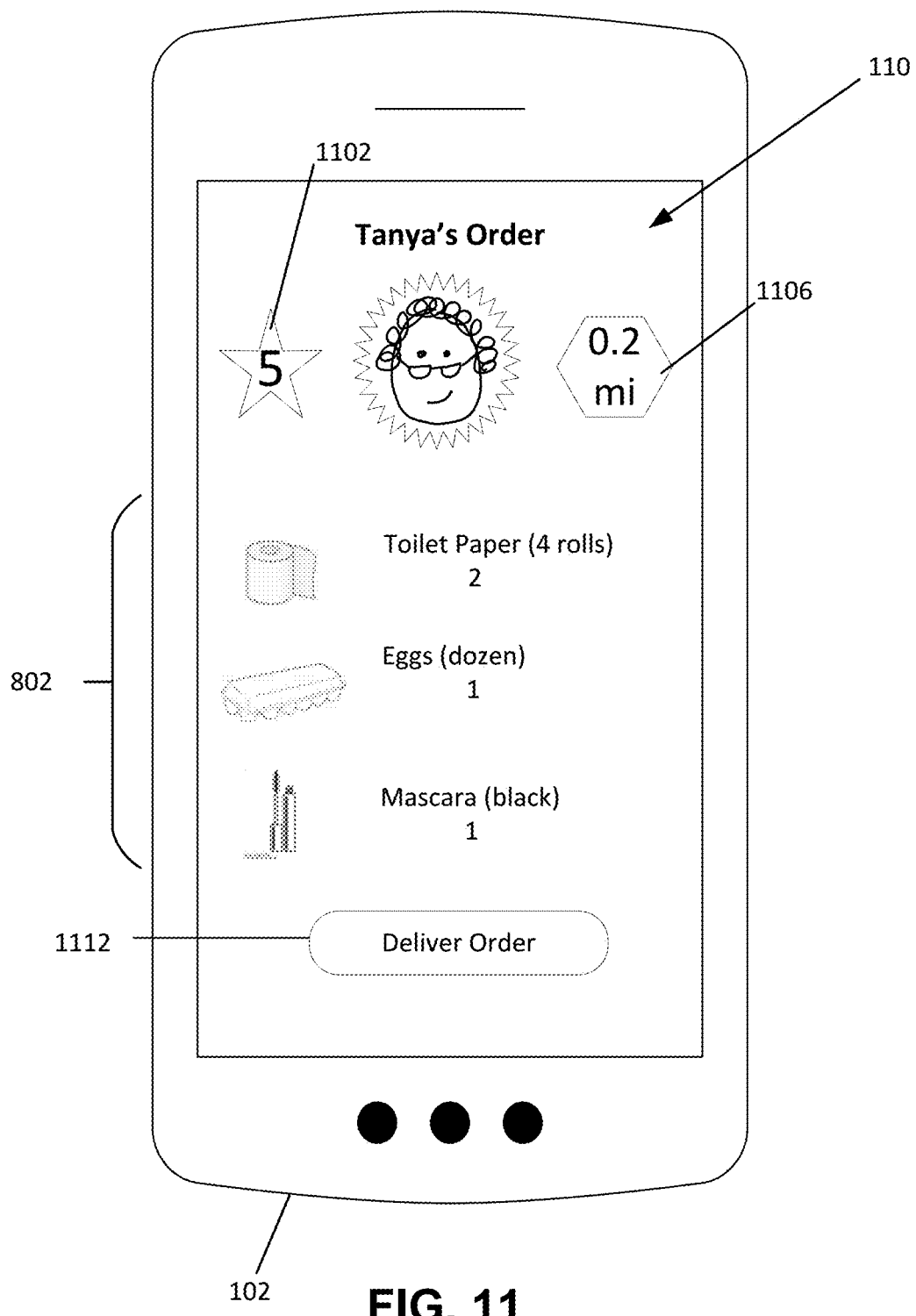
FIG. 11 illustrates an example embodiment of a delivery user display showing customer user request information.

Further information about the customer user C's order is displayed in FIG. 11. A rating 1102 for the user is displayed along with the distance 1106 that the customer user is from the delivery user. In this example, the user, Tanya, has a 5 star rating 1102 and is 0.2 mi from the delivery user's home. A summary of the customer user's request 802 is presented as images representing each item. The delivery user can select the button 1112 to deliver the request.

Figure 12:
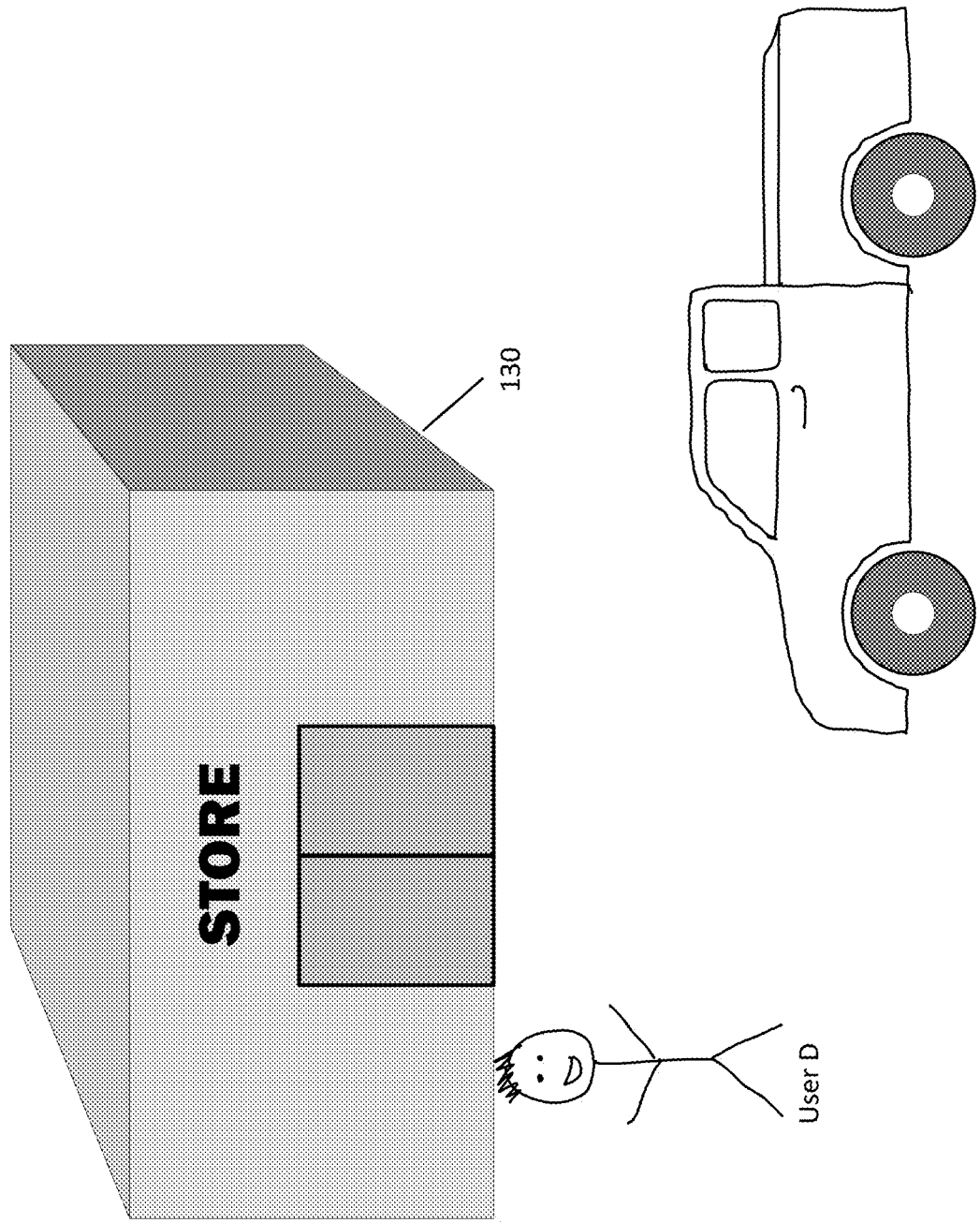
FIG. 12 illustrates a delivery user arriving to a retail store.

Returning to FIG. 6, at operation 608 the computing system receives a notification message from the delivery user's computing device indicating that the delivery user will deliver the requested goods from the retail store to the customer user. In the example of FIG. 11, the notification message is sent after the delivery user has selected the button 1112 to deliver the request. In FIG. 12, the user D has accepted the user C's request and has traveled to the retail store 130.

At operation 610 of the method 600 of FIG. 6, the computing system receives a pickup confirmation message from the retailer indicating that the delivery user has picked up the requested goods.

Figure 13:
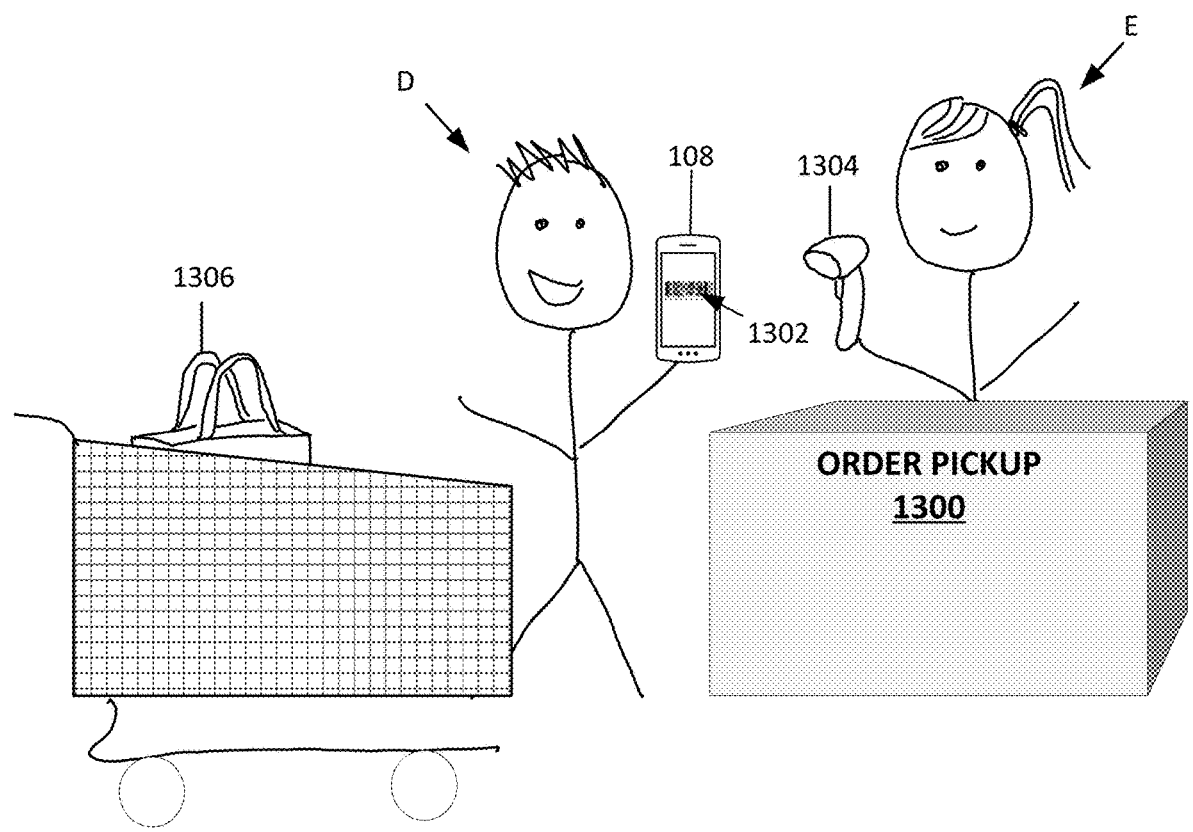
FIG. 13 illustrates a delivery user picking up an order at a retail store.

In FIG. 13, the user D has already checked out with his items and has them stowed in a shopping cart in the delivery user's shopping bag 1306. User D has now stopped at the order pickup counter 1300 and is presenting a barcode 1302 for the customer user's order on his smartphone 108. An example of this barcode 1302 is displayed in FIG. 14. The employee E will scan the barcode 1302 with the barcode scanner 1304 to electronically look up the order. The barcode scan is received at a point of sale device (POS) to confirm which order the delivery user is picking up. Then the employee E will bring the prepared order to the delivery user D to take back to the customer user C. In some embodiments a barcode on the prepared ordered is also scanned at the POS and a matching barcode scan is received. The barcode scan can also submit a confirmation message to the system and the customer user C that the order has been picked up.

Figure 14:
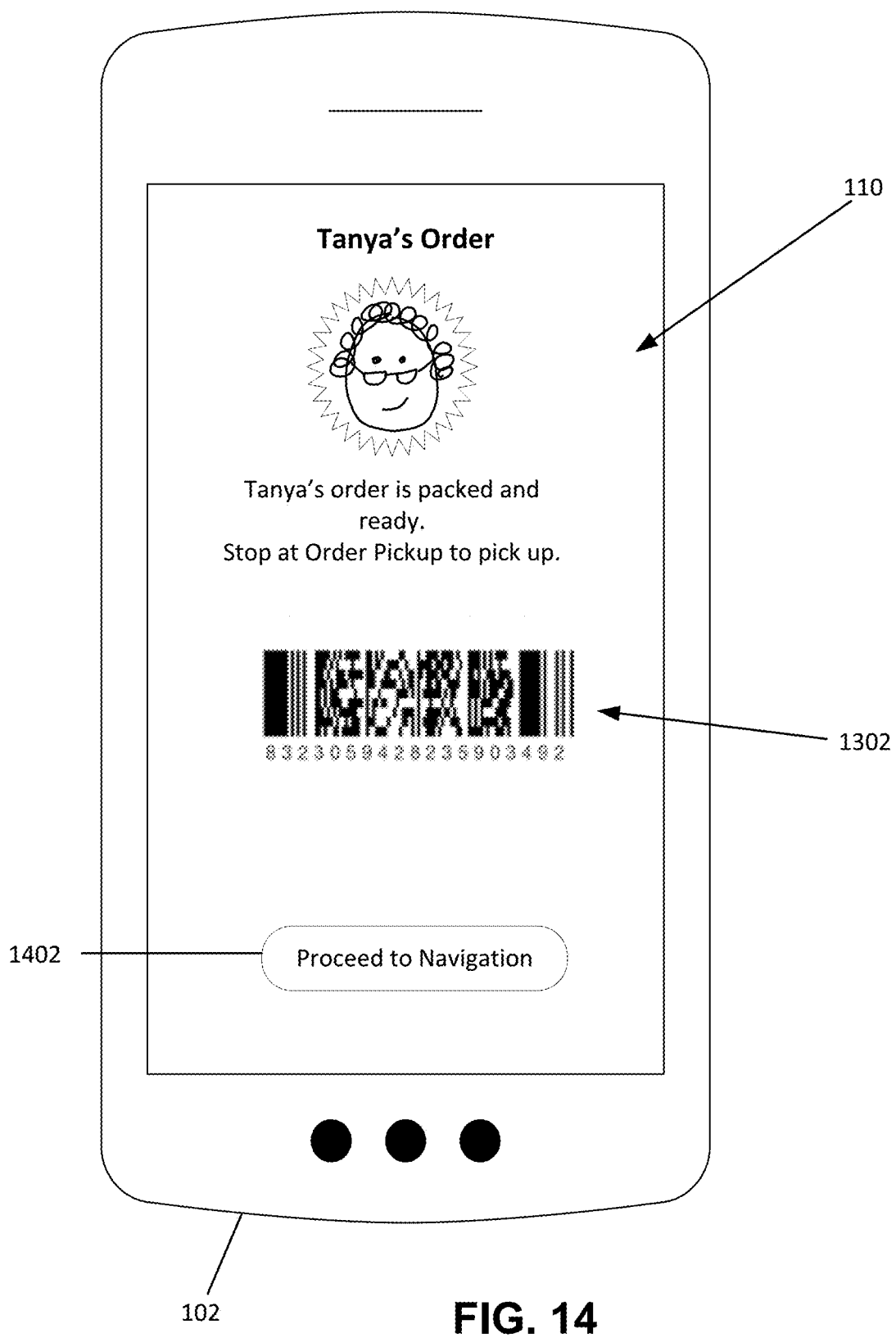
FIG. 14 illustrates an example embodiment of a delivery user display showing customer user order information used for picking up an order.

Also displayed in FIG. 14 is a button 1402 that can be selected by the delivery user D once the order has been picked up. In some embodiments, receipt of input of the button 1402 at the delivery user computing device will automatically activate a navigation application on the user D's smartphone 108 which will provide directions to the customer user's home.

Figure 15:
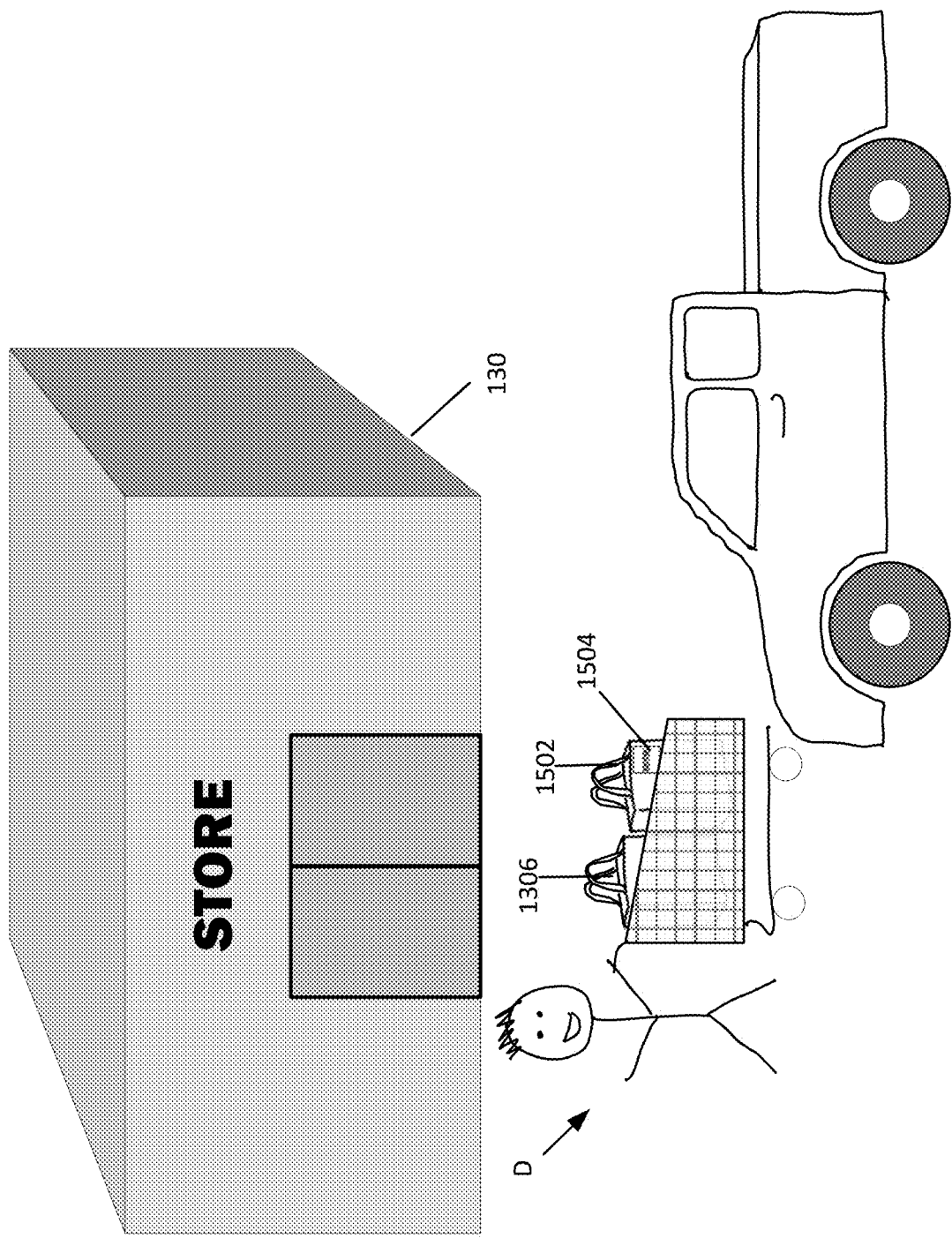
FIG. 15 illustrates a delivery user departing a retail store.

In FIG. 15, the delivery user D has obtained his own items in his bag 1306 and has also picked up the customer user C's requested goods in customer bag 1502. The customer bag 1502 may include a receipt or other label indicating that it belongs to the customer user C. In this example, a receipt 1504 with a barcode is attached to the customer bag 1502. The barcode can be scanned by the employee E mentioned in FIG. 13 to confirm that the bag matches the customer's order. The barcode can also be used to confirm delivery, as described in FIG. 17.

Figure 16:
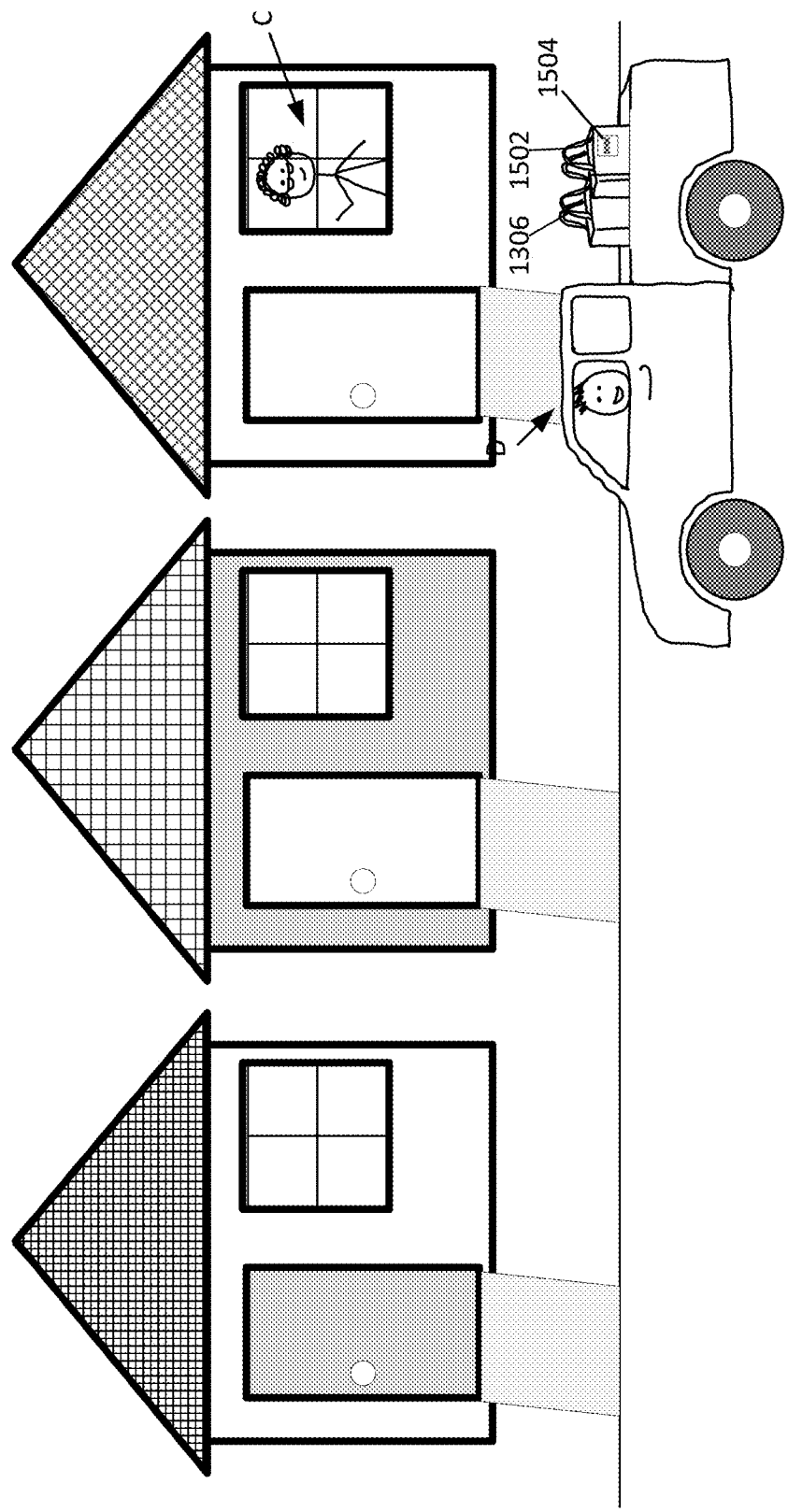
FIG. 16 illustrates a delivery user arriving at a customer user's home.

In FIG. 16, the delivery user D has traveled to the customer user's home and is preparing to drop off the customer user C's order in the customer bag 1502.

Returning to FIG. 6, at operation 612 the computing system receives a delivery confirmation message from one of the customer user computing device or the delivery user computing device. This confirmation indicates that the delivery user has successfully delivered the customer user's order to the customer user's home.

Figure 17:
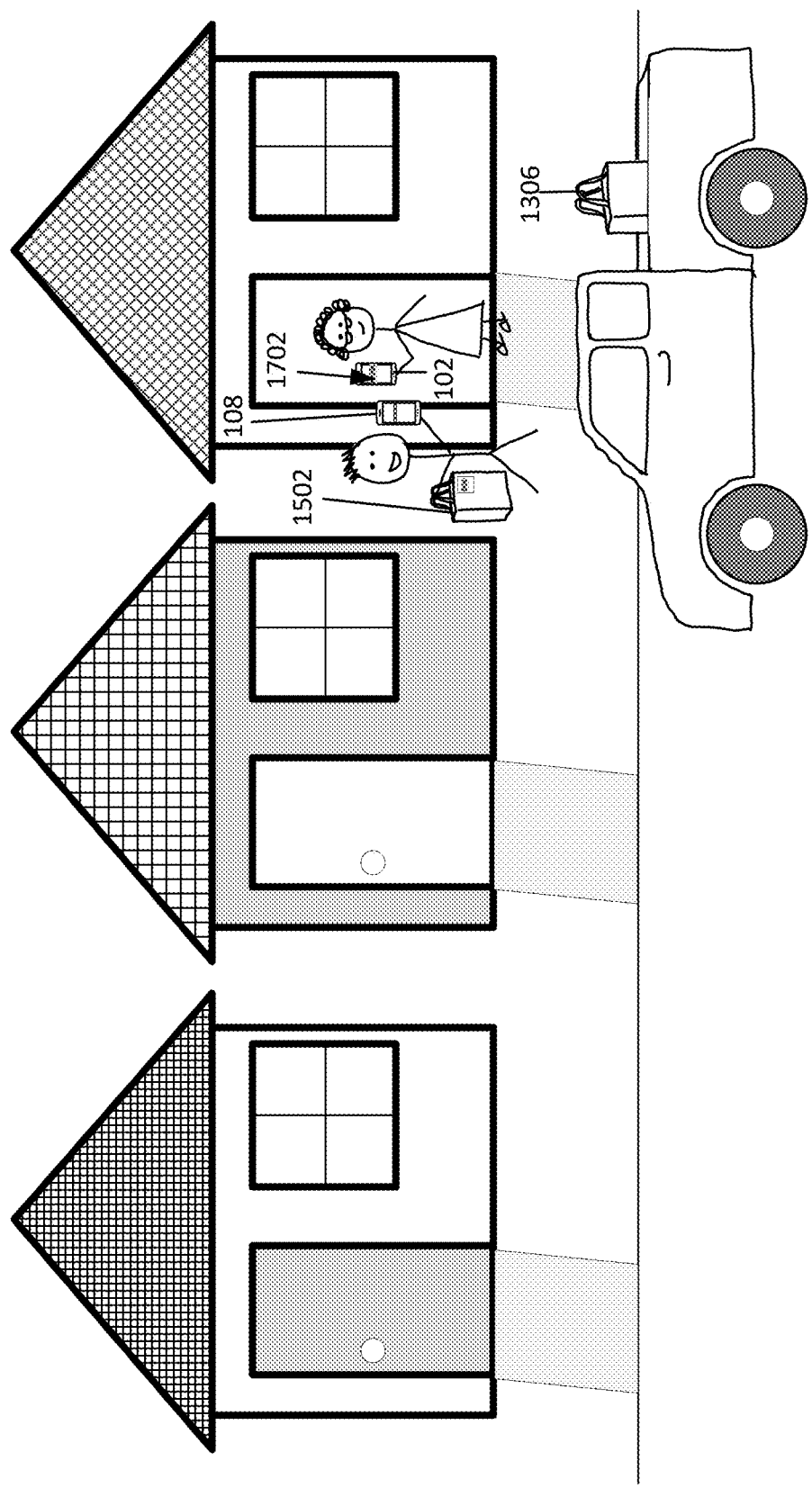
FIG. 17 illustrates a delivery user delivering an order to a customer user.

FIG. 17 illustrates an example of delivery taking place. The delivery user D has brought the customer bag 1502 containing the goods requested by the customer user C to the customer user's home. In this example, confirmation of delivery is being performed by the delivery user's computing device 108 which is scanning a barcode on the customer user's computing device 102. Upon scanning the barcode, the delivery user's device 102 sends a confirmation message to the delivery facilitation server 112. In other embodiments, a delivery confirmation message may be sent to the server 112 after the customer user computing devices receives input of the barcode on the customer's bag 1502. In yet other embodiments, confirmation of delivery could be automatically sent when the delivery user arrives at the customer user's home based on the GPS location of the delivery user's computing device 108. In another example, if the customer user C is not home to receive the order, the delivery user D can confirm delivery by capturing a photograph of the bag 1502 at the customer user's home and submitting it to the system.

Figure 18:
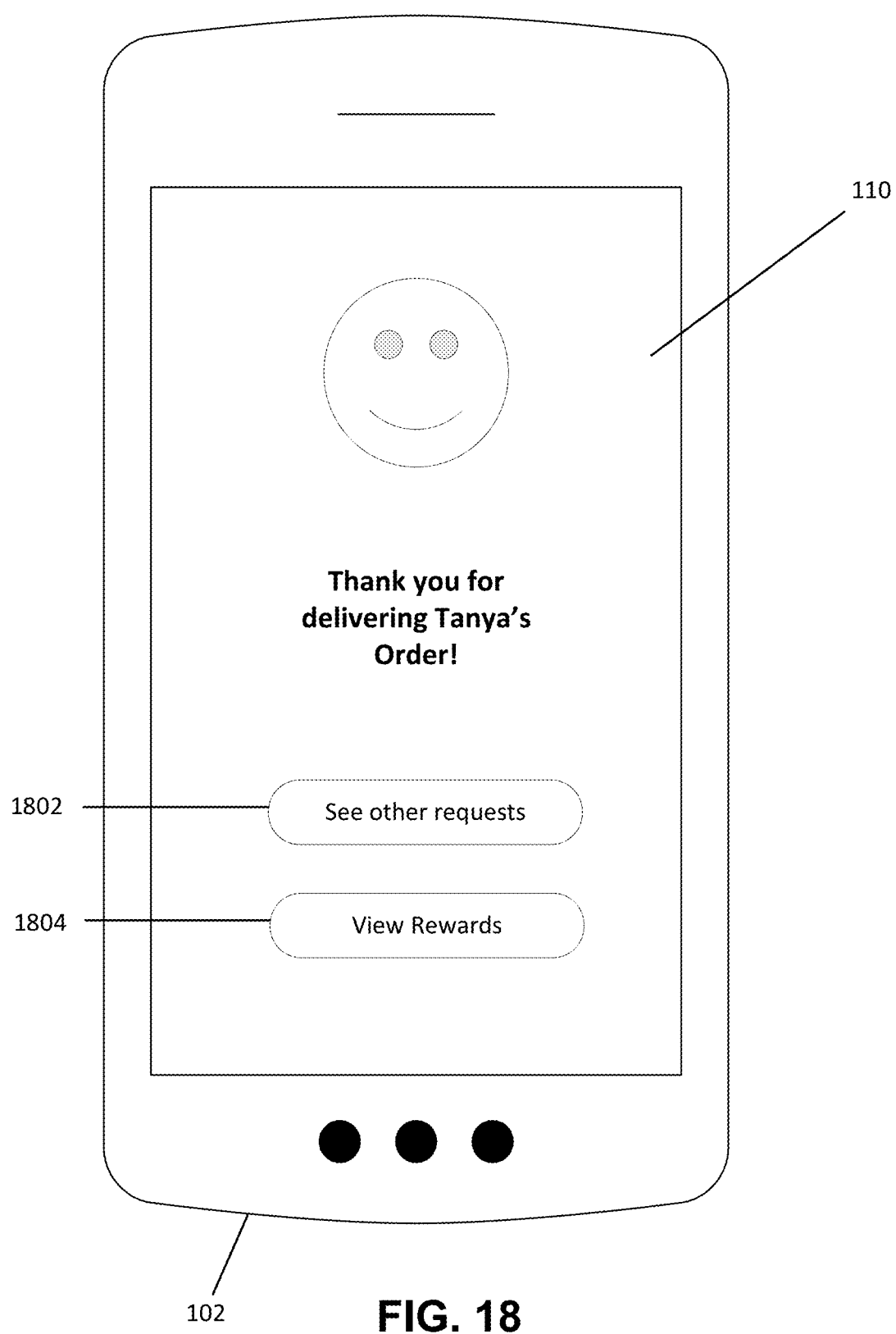
FIG. 18 illustrates an example embodiment of a delivery user display presented after completing a delivery.

FIG. 18 illustrates an example display on the delivery user's computing device 108 that may be shown after the delivery user has completed a delivery. To see additional requests, the delivery user D could select the button 1802. The delivery user D could select the "View Rewards" button 1804 to review a screen for information about rewards the user has earned from making deliveries.

Figure 19:
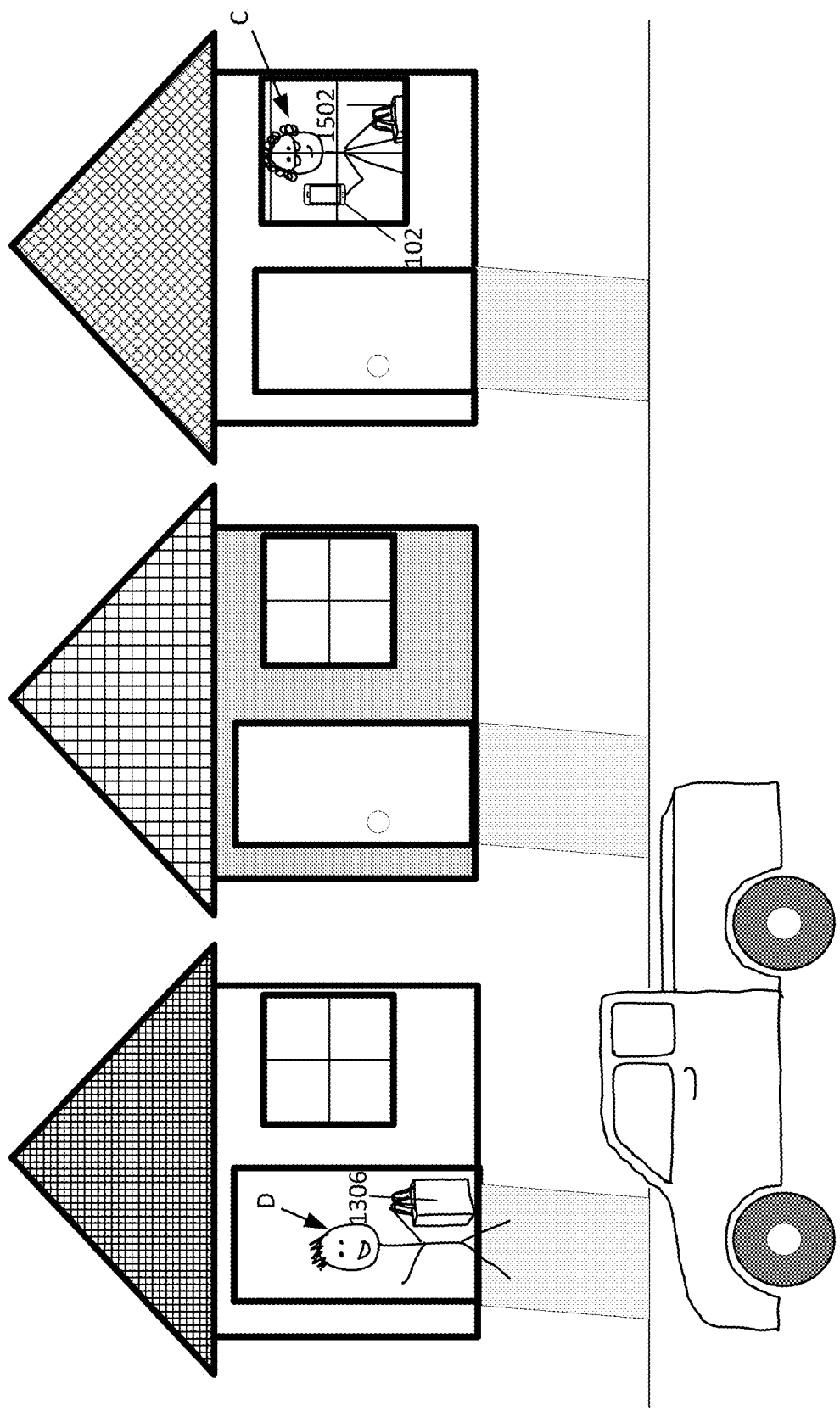
FIG. 19 illustrates a delivery user returning to his home and a customer user with her completed order.

In FIG. 19, the customer user C has her requested goods in the customer bag 1502. A rating or other additional feedback may be gathered about the transaction from the customer user C on her computing device 102. The delivery user D is returning to his home with his bag 1306 of items.

Figure 20:
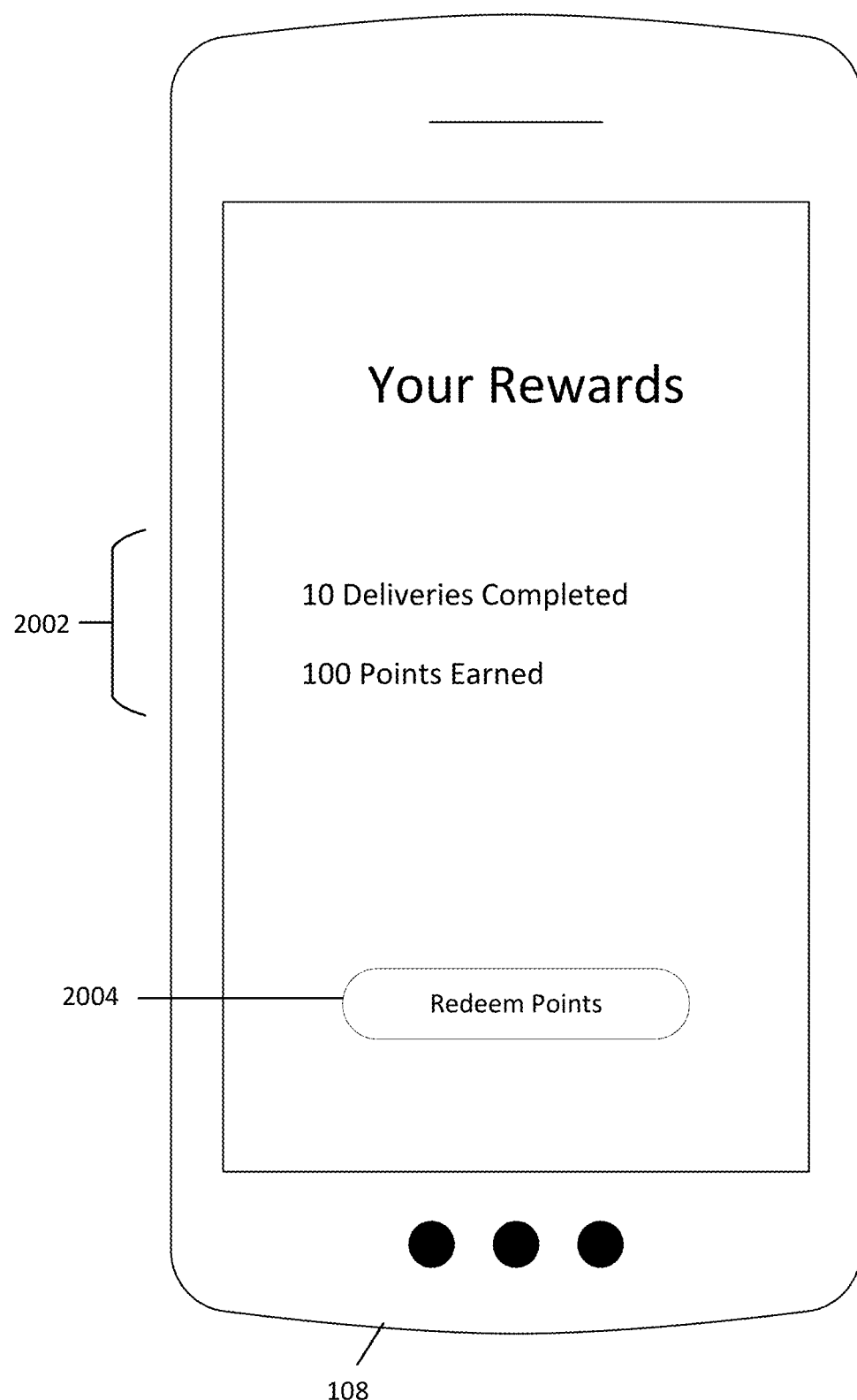
FIG. 20 illustrates an example embodiment of a delivery user display presenting reward information.

FIG. 20 illustrates an example display of a reward screen as displayed on a delivery user's computing device 108. Information about the delivery user D's rewards 2102 is displayed, indicating that 10 deliveries have been made and 100 points earned. In this embodiment, the delivery user D earns points for completing deliveries and the customer user C is not charged a delivery fee for the items she has ordered because the delivery user D has agreed to perform deliveries for members of his neighborhood. The points earned by the delivery user D can be exchanged for goods from the retail store, store credit, or for other non-monetary rewards such as badges that will displayed on the delivery user's profile.

Figure 21:
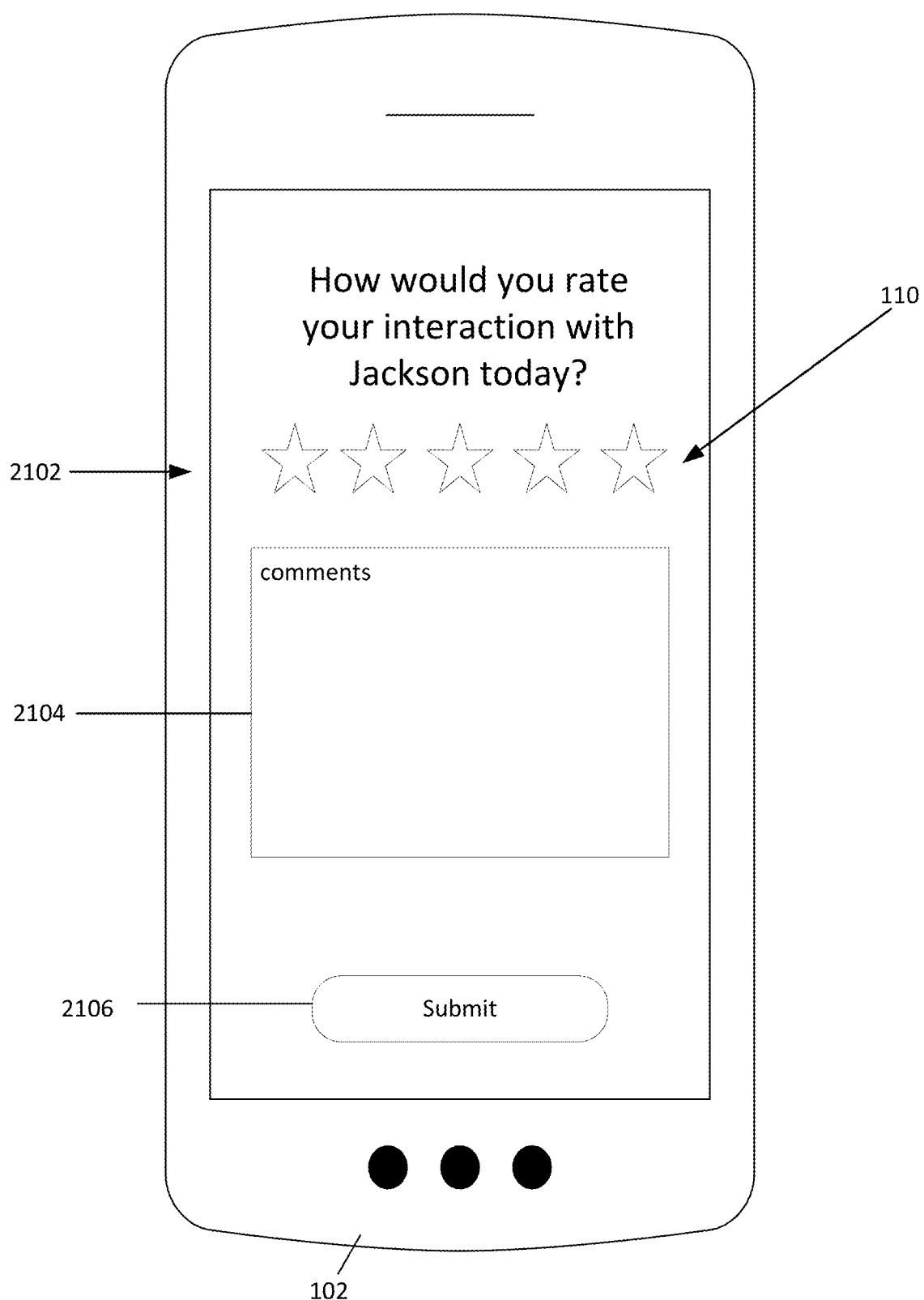
FIG. 21 illustrates an example embodiment of a customer user display presenting a ratings screen.

FIG. 21 illustrates an example display of a ratings screen as displayed on a customer user's computing device 102. Ratings of the transaction are received from the customer user computing device 102 by the delivery facilitation server 112. In the display, the customer user C is asked "How would you rate your interaction with Jackson today?" The customer user C can rate her interaction with the delivery user D on a scale of 1-5 stars. Other ratings system are possible. The customer user C can also leave comments regarding the delivery in the comment box 2104. To submit the rating, the customer user C selects the "Submit" button 2106. Delivery users can similarly rate customer users that they interact with during deliveries.

Figure 22:
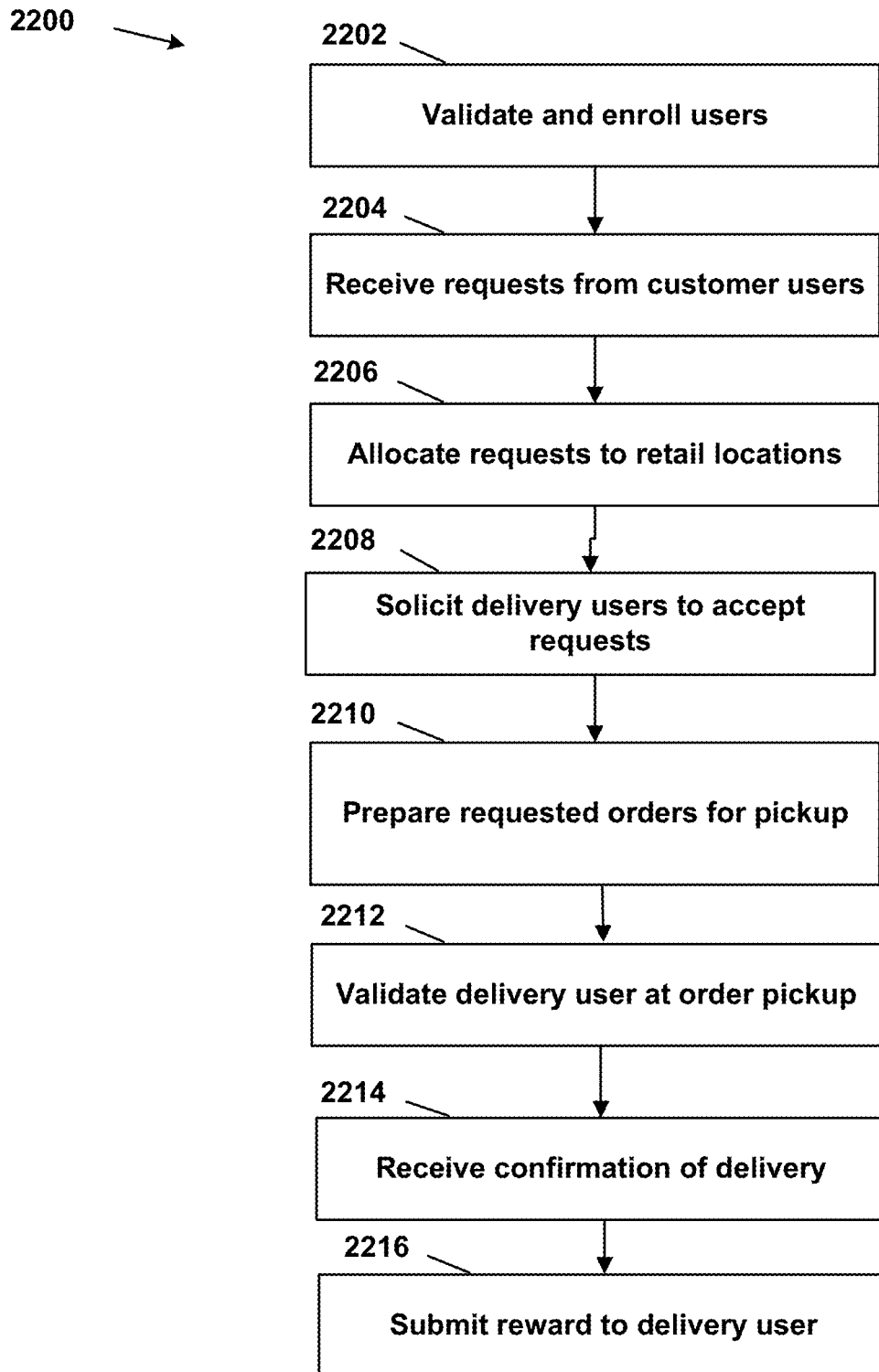
FIG. 22 illustrates an example flow chart of a method of facilitating delivery of goods performed by the delivery facilitation server of FIG. 1.

FIG. 22 illustrates a flow chart of an example method 2200 of facilitating delivery of goods from a retailer, as performed by a computing server operated by the retailer. The retailer crowd-sources, contracts, or hires delivery users to complete delivery of goods from retail locations to customer users. In some aspects, a system operated by a retail entity operates to perform the steps of the method 2200. In some aspects the retail entity includes multiple retail locations or stores, each having different inventory available at any given time. In this method, delivery users are recruited to perform deliveries to customers of the retailer. The delivery users may be customers of the retailer as well, or may simply wish to earn money by performing last mile deliveries for the retailer.

The method 2200 of FIG. 22 is similar to the method illustrated in FIGS. 7-21. FIGS. 23-28 show examples where the method 2200 differs most from the method 600.

At operation 2202, users are validated and enrolled into a delivery network. The delivery network services a retail organization including a plurality of retail locations. In some embodiments, enrolling is done simply by downloading an application and setting up a username and password. Validation of users can simply include determining an address or general geographic location associated with the user. In some embodiments, users will create logins and profiles to use with the system.

In some embodiments, customer users do not need to enroll to receive home deliveries. Instead they simply order goods and same-day home delivery is one of the options. Customer users may need to provide a valid payment method.

In some embodiments, the delivery users must pass additional checks to enroll as a delivery driver. In such embodiments, the retailer may oversee the validation of delivery users. Delivery users may need to provide proof of driver's license and vehicle insurance to enroll. In some embodiments, the delivery users may need to pass a background check. Delivery user vetting and onboarding methods are further described in FIGS. 31-32.

At operation 2204, order requests are received from customer users. Order requests include a list of items that the customer user wants to purchase and have delivered from a retailer. In one example, the order request could be for delivery of groceries from a grocery store. In some aspects, the customer user can request a speed of delivery and/or a delivery time window.

For example, a customer user could select from options such as 2 hour delivery, same day delivery, and next day delivery. Each option could have an associated delivery fee, with the shorter time frame typically having a higher fee. In some instances, the retailer could bear some or all of the delivery costs.

Additionally, the customer user could select a preferred time for delivery by selecting a time window during which delivery would be made. The time window could be 1 hour in length, 2 hours, 3 hours, 4 hours, 6 hours, or 12 hours in length. For example, a customer user could order goods for delivery in the same day and then select a delivery time window of 4 pm to 6 pm.

The customer orders must include a delivery address, indicating where the requested goods are to be sent. The delivery address is used to select the nearest retailer location for fulfillment of the order and to select a delivery user to complete the delivery.

At operation 2206, customer order requests are allocated to retail locations. In this embodiment, there are multiple retail locations associated with a retail organization. In some aspects, the customer's order is submitted to the nearest retail location to the customer user's address. In some embodiments, orders are allocated to retail locations based on proximity to available delivery users. Allocation is also based on determining that a retail location has the goods necessary to fulfill the customer user's request. A retail location is chosen that can fulfill the request within the requested timeframe.

At operation 2208, at least one delivery user computing device is selected to present the order information to. In some embodiments, the delivery facilitation server 112 must receive an indication from the delivery user computing device that a delivery user associated with the delivery user computing device is available to deliver orders. In some embodiments, the delivery user computing device is selected based on receiving an indication that a delivery user associated with the delivery user computing device will be traveling to a geographic location located within a predefined distance of the address to which the order needs to be delivered. In some embodiments, the delivery user computing device is selected based on receiving an indication that a delivery user associated with the delivery user computing device will be traveling to the retail location allocated to fulfill the order. In some aspects, the delivery user computing device selected based on its location being within a predefined distance of the retail location. In some aspects, the delivery user computing device selected based on its location being within a predefined distance of the address to which the order needs to be delivered.

A delivery user that has indicated they are traveling to a destination near to the delivery address of an order that is being prepared at a retail location where the delivery user is at or will be at will be contacted. In some aspects, multiple delivery users could access the delivery system with a computing device to determine if there are customer orders that are ready for pickup at a nearby retail store.

Figure 23:
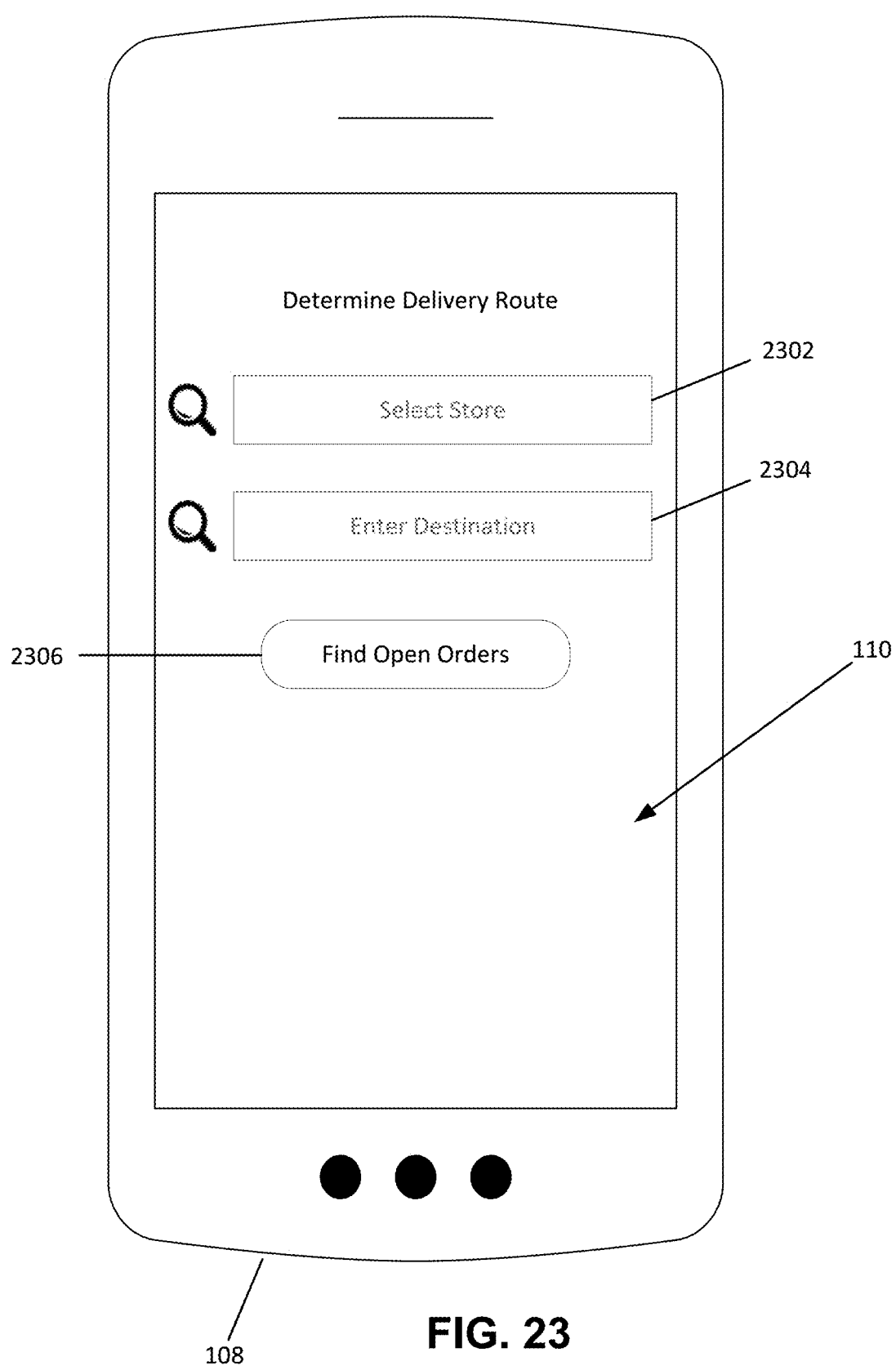
FIG. 23 illustrates an example delivery user display presenting fields to enter a destination.

In the example of FIG. 23, the delivery user is asked to input a store at which the delivery user can pick up orders in box 2302. The store location can be automatically generated based on the closest retailer location to the delivery user's current location. The delivery user is also asked to input into box 2302 a destination. This is optional if the delivery user is not traveling to a particular destination and just wants to make deliveries in the area.

Upon selecting the button 2306, the delivery user will be shown available orders that need to be delivered to the general area to which the delivery use will be traveling. In some aspects, the orders that are displayed may be within a predetermined distance of the delivery user's anticipated route. The orders could be displayed if within a predetermined distance of the delivery user's current location or of a particular retail store's location.

Figure 24:
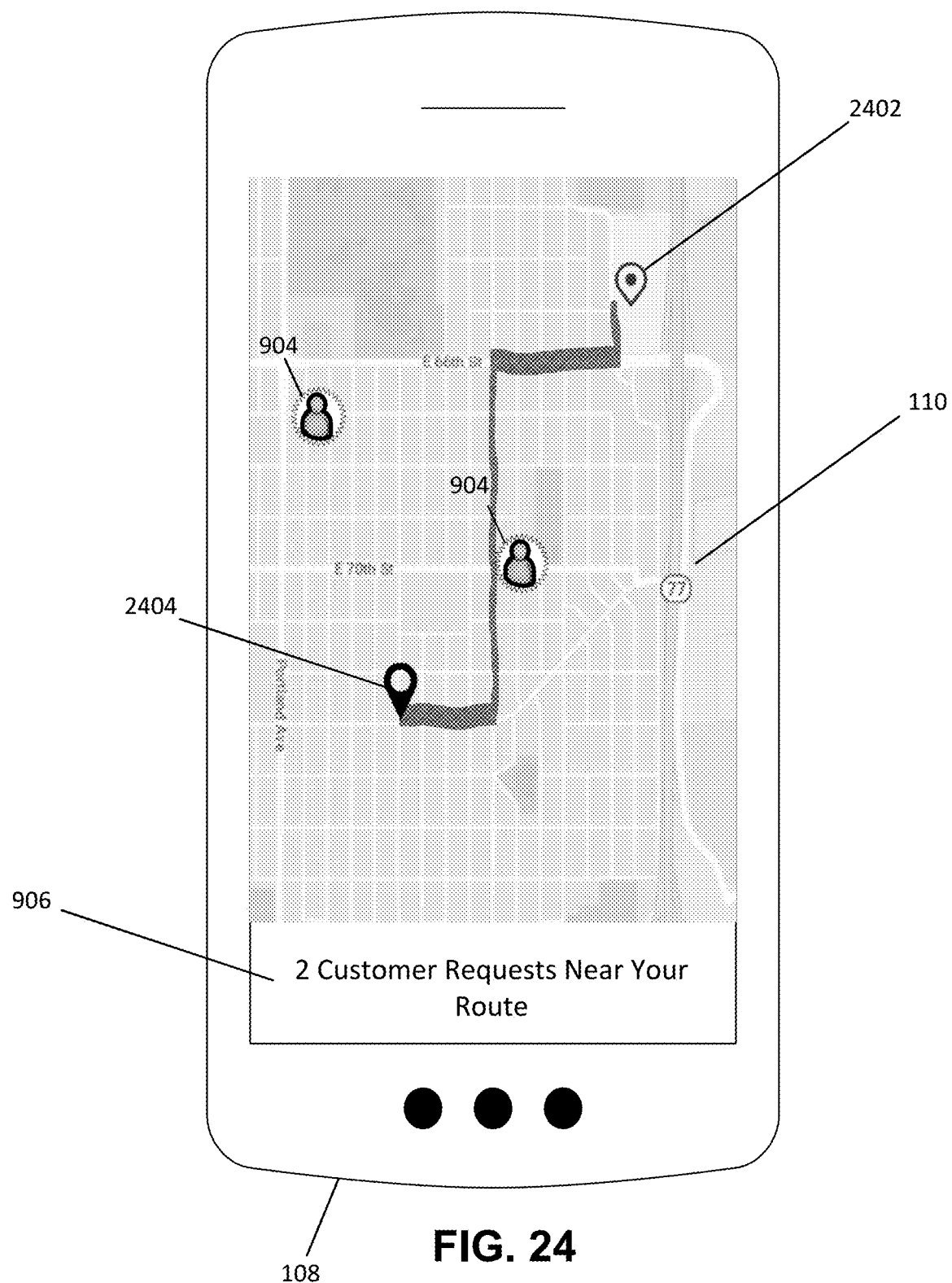
FIG. 24 illustrates an example delivery user display presenting a proposed route.

FIG. 24 shows an example display 110 on a delivery user's computing device that shows available orders for pickup that are near to the delivery user's anticipated route based on the destination that the delivery user entered into the fields of FIG. 23. The selected store is shown with a marker 2402, as well as the delivery user's destination 2402. The route between the store and the destination is marked. User icons 904 are displayed on the map, indicating the locations where deliveries are to be made. The order information 906 indicates that there are 2 available customer requests near the delivery user's route.

Figure 25:
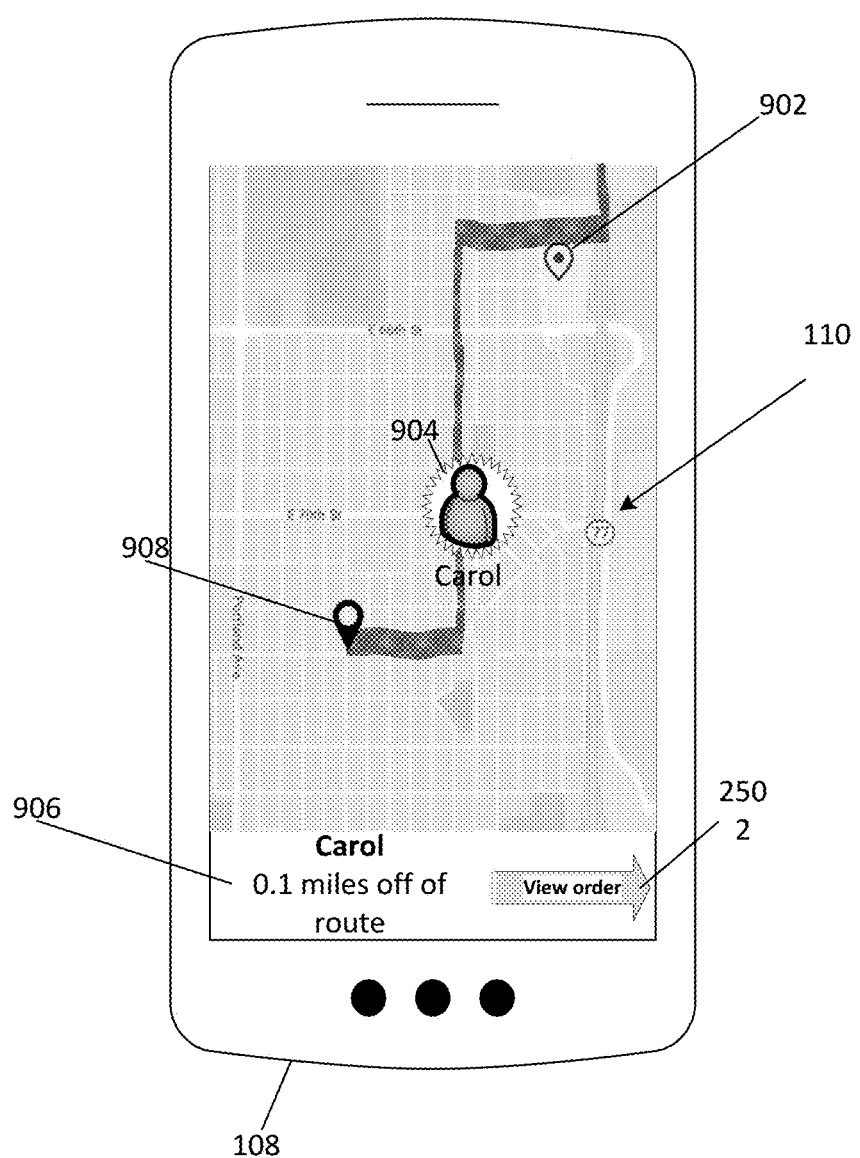
FIG. 25 illustrates an example delivery user display presenting a customer user that placed an order.

Selecting one of the user icons 904 leads the computing device 108 to display additional information about the customer user and request. FIG. 25 shows that the selected user icon 904 is for Carol, who is requesting a delivery 0.1 miles off of the delivery user's anticipated route. By selecting the "View Order" button 2502, the delivery user can view additional details about Carol's order to determine if he wants to accept her delivery.

Delivery users can opt to accept or reject order requests for delivery. Upon accepting a delivery, a delivery user may receive additional information about the order and the customer user placing the order as well as receive notifications about the status of the order, such as when the order is ready to be picked up and when the order needs to be delivered.

Figure 26:
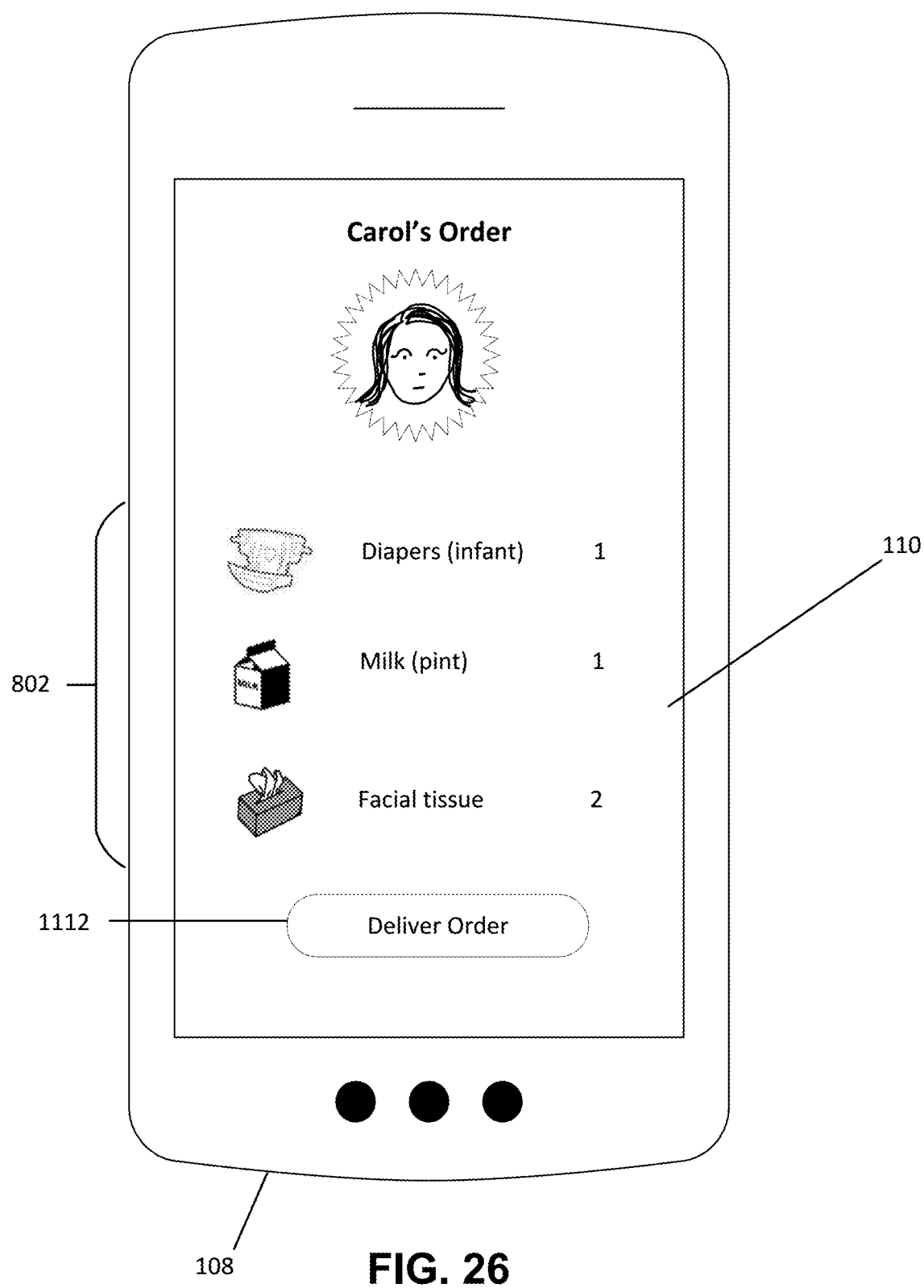
FIG. 26 illustrates an example delivery user display presenting a customer user's order information.

FIG. 26 shows an example display of additional order information on the delivery user's computing device 108. Similar to FIG. 11, the customer user's requested items 802 are displayed. The delivery user can accept the order by selecting the "Deliver Order" button 1112. In some embodiments, the customer user's list of requested items may not be displayed until the delivery user accepts the order.

Referring again to FIG. 22 at operation 2210, the requested order is prepared for pickup at the retail location. Instructions are provided to one or more employees at the retail location to prepare the requested order for pickup. Typically, employees of the retailer will gather the requested items so that the delivery user can easily pick up the order and deliver it to the customer user. The prepared order may be packaged in a bag or box affixed with a receipt or label indicating which customer user it belongs to. In some embodiments, a notification will be sent to the delivery user computing device and/or customer user computing device when the order is ready to be picked up at the retail store.

At operation 2212, the identity of the delivery user is validated at pickup. The delivery user may have been shopping at the retail store or simply came to pick up the order. The delivery user validates his or her identity and provides proof that he or she is to pick up the customer user's order. In some embodiments, the delivery user provides a barcode on a screen of a smartphone to identify the order that is to be picked up, as shown in FIG. 13. The barcode is received by a point of sale (POS) device. In addition, an employee of the retail store may request that the delivery user provide identification such as a driver's license in order to receive the requested order. In some embodiments, the POS device also scans a barcode or otherwise validates that the correct order is provided to the delivery user.

The POS device can communicate a notification message to a delivery facilitation server 112 indicating that the delivery user has picked up the order. In some embodiments, a notification message is sent to the customer user computing device indicating that the delivery user has picked up the order.

Figure 27:
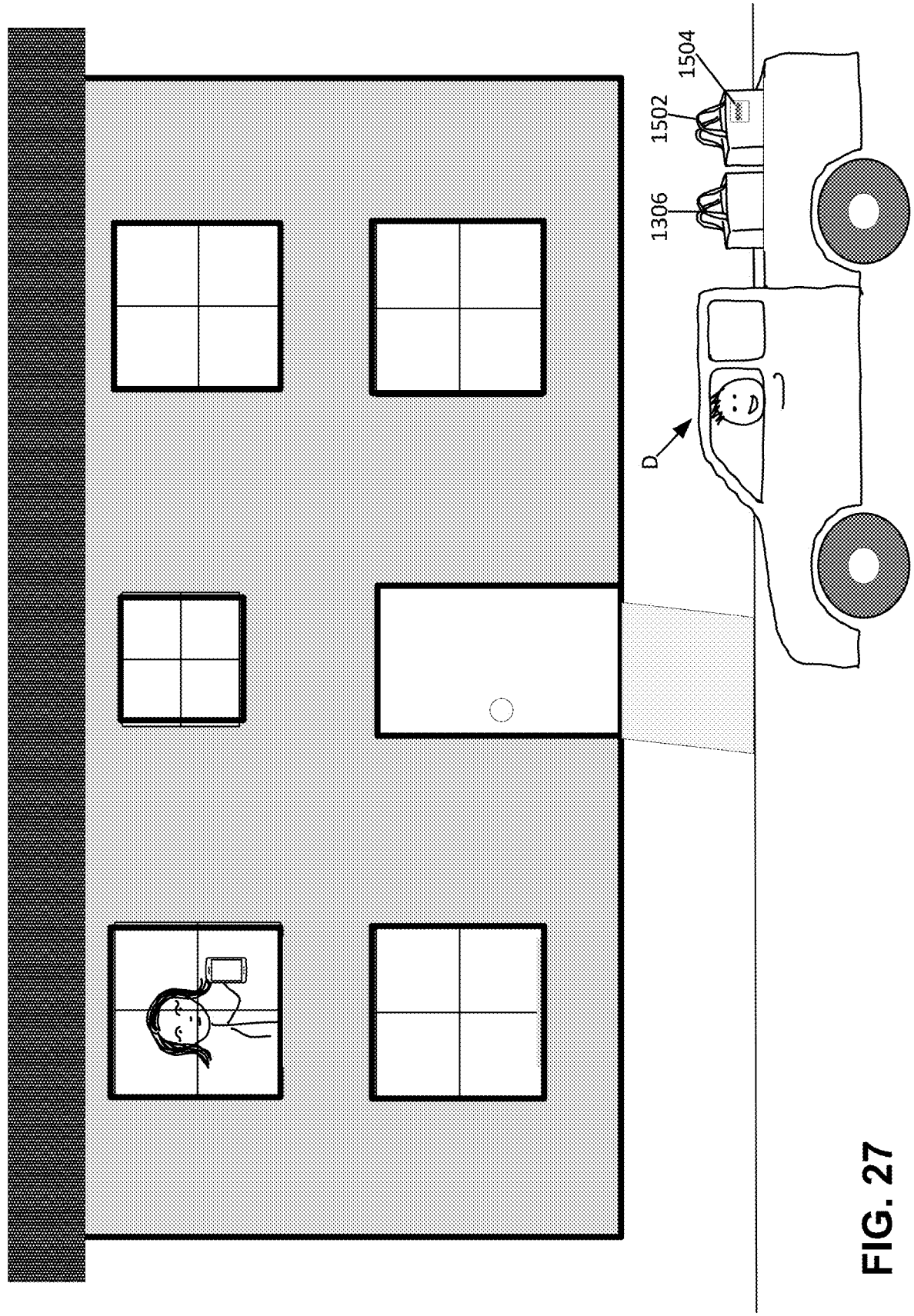
FIG. 27 illustrates a delivery user arriving at the home of a customer user.

FIG. 27 illustrates an example of a delivery user D arriving at the address of the user, Carol, to deliver her requested order.

At operation 2214, the system receives confirmation of delivery of the requested order to the customer user. As is described in FIG. 17, confirmation could be provided by one user scanning a barcode displayed on another user's computing device. In other embodiments, confirmation could be provided by the delivery user, customer user, both, or neither.

Figure 28:
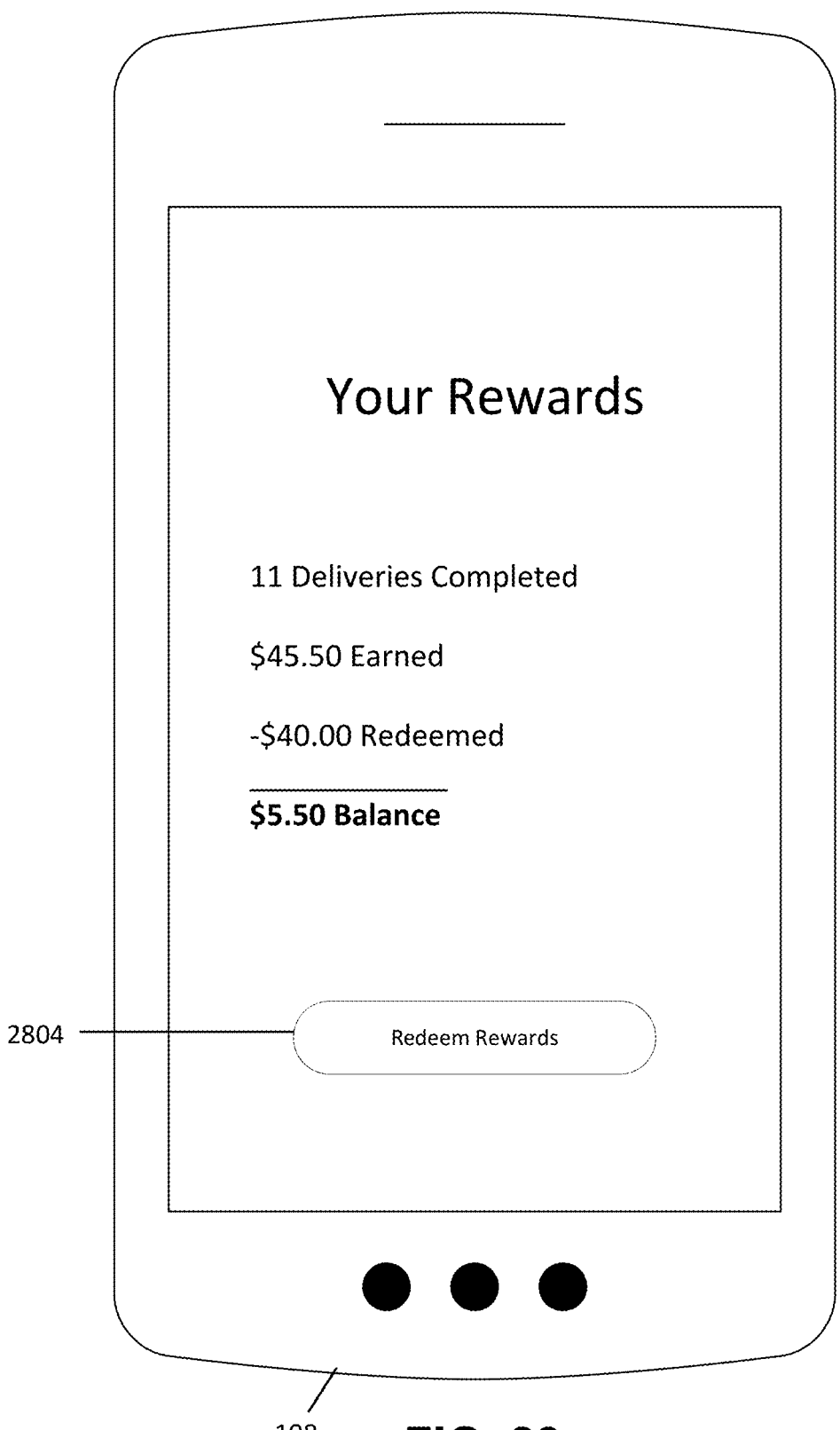
FIG. 28 illustrates an example delivery user display presenting reward information.

At operation 2216, a reward is submitted to the delivery user. In some aspects, the delivery user earns a fee for performing the delivery. This fee can be indirectly paid by the customer user as part of the order made to the retailer and the retailer pays the delivery user electronically. In some embodiments, the retailer pay some or all of the delivery fee to the delivery user. For example, as shown in FIG. 28, the delivery user can be rewarded monetarily. In this example, the delivery user has completed 11 deliveries and earned $45.50. The delivery user can continue to accumulate money received from fees in this account, or opt to redeem the rewards by selecting the "Redeem Rewards" button 2804. Redeeming the reward could order a gift card or gift credit. Alternatively, redeeming rewards could result in the value of the rewards being transferred to a bank account associated with the delivery user.

In some embodiments, a message is automatically delivered to a delivery user computing device upon successful completion of a delivery. The message indicates that the delivery user associated with the delivery user computing device has earned a reward. In some instances, the reward is automatically transferred to an account associated with the delivery user. In other aspects, a command is automatically sent for a reward to be mailed to an address associated with a delivery user computing device when the delivery user associated with the delivery user computing device has earned a predetermined value of reward. For example, whenever the delivery user earns $10.00 in rewards, the delivery facilitation server 112 could generate a command for a $10.00 gift card to be mailed to the delivery user.

Figure 29:
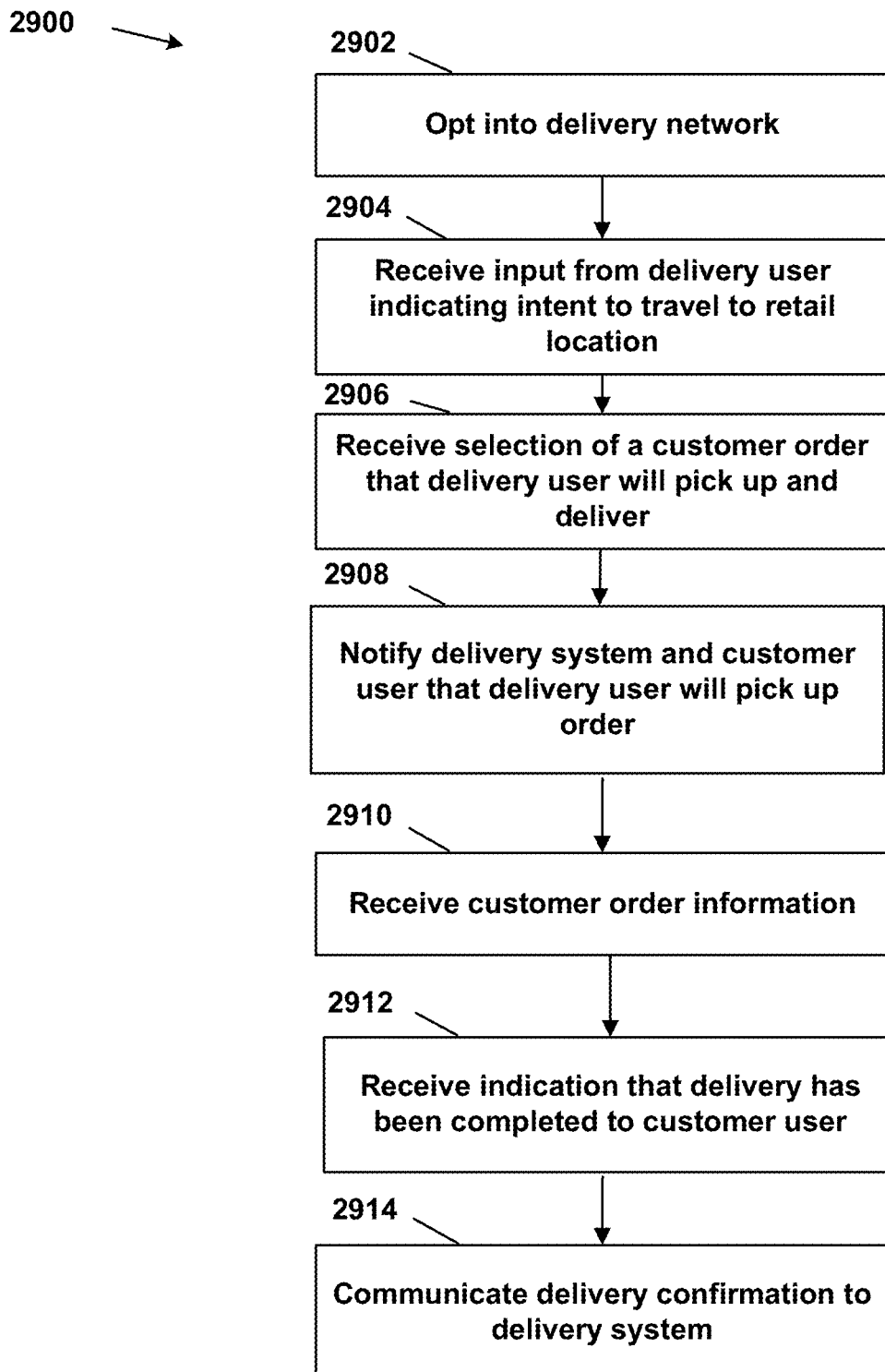
FIG. 29 is a flow diagram illustrating a method of facilitating delivery of goods that is performed by the delivery user computing device of FIG. 1.

FIG. 29 illustrates a flow chart of an example method 2900 of facilitating delivery of goods from a retailer, as performed by a delivery user computing device.

At operation 2902, the delivery user computing device communicates with a server to opt into a delivery network. A vetting process may be required. Input device(s) 206 may be used by a delivery user to enter required information into the system of the delivery network.

At operation 2904, input is received at the delivery user computing device from a delivery user, indicating an intent to travel to a retail location.

At operation 2906, the computing device receives a selection from the delivery user of a customer order. This selection indicates that the delivery user has accepted the order and will pick up the requested order and deliver it to a customer user.

At operation 2908, the delivery user computing device notifies the delivery system and customer use that the delivery user has accepted the order and will be delivering the order to the customer user.

At operation 2910, additional customer order information is received from the delivery system by the delivery user computing device. Additional customer order information could include identifying information such as an exact delivery address, phone number, full name of customer user, etc.

At operation 2912, the delivery user computing device receives an indication that delivery has been completed to the customer user. The indication could be scanning a barcode with the delivery user computing device, receiving an input from a delivery user, or receiving a message sent by the customer user indicating that delivery is complete.

At operation 2914, delivery confirmation is communication to the delivery system. This step may occur at the same time as operation 2912.

Figure 30:
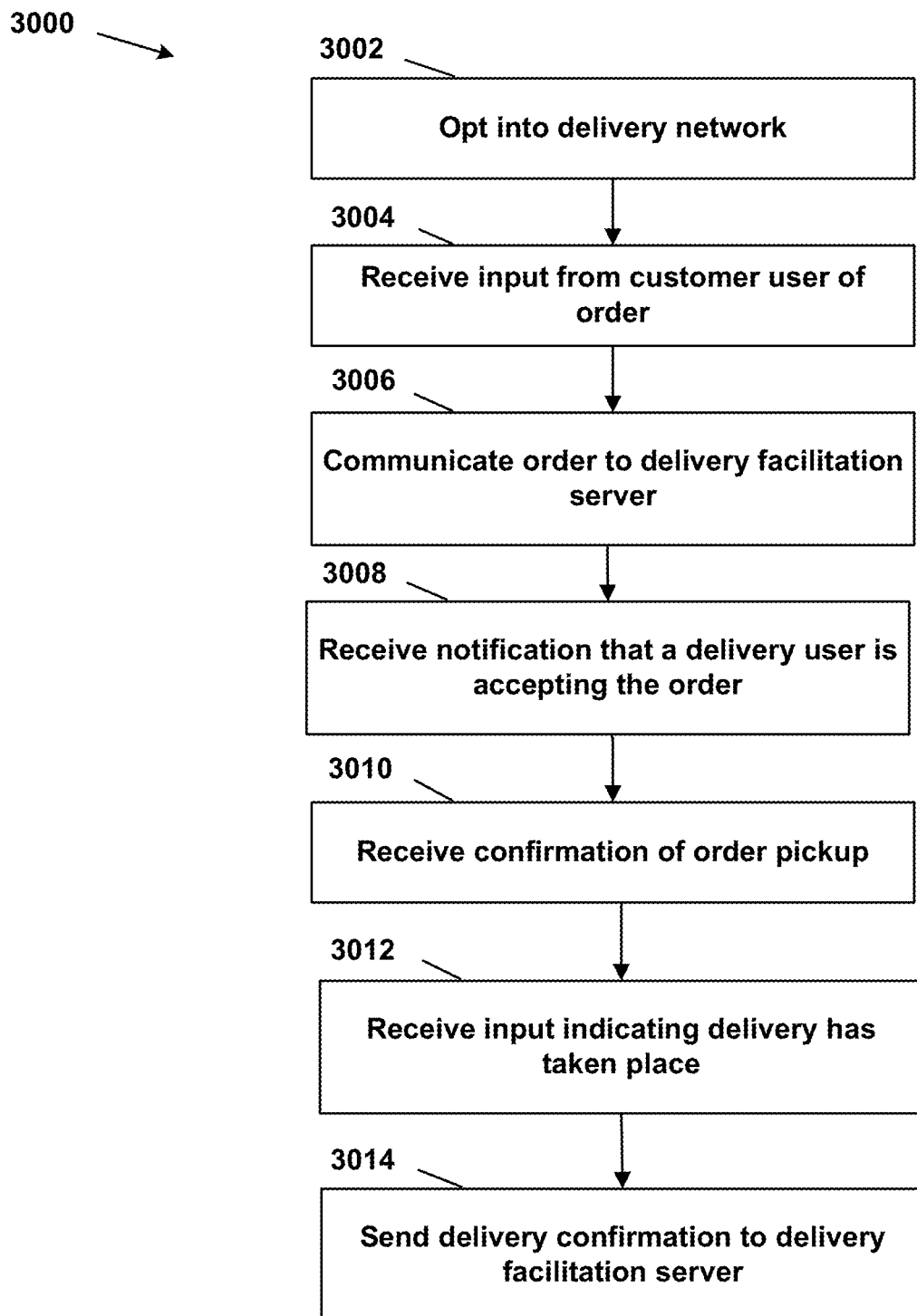
FIG. 30 is a flow diagram illustrating a method of ordering goods for delivery that is performed by the customer user computing device of FIG. 1.

FIG. 30 illustrates a flow chart of an example method 3000 of facilitating delivery of goods from a retailer, as performed by a customer user computing device.

At operation 3002, the customer user computing device communicates with a server to opt into a delivery network. Input device(s) may be used by a customer user to enter required information into the system of the delivery network. In some embodiments, if the customer user is already a customer of a retailer involved in the delivery network, there may not be any additional steps required to join the network.

At operation 3004, input is received at the customer user computing device from a customer user, requesting one or more items to be delivered from a retailer.

At operation 3006, the customer's order is communicated from the customer user computing device to the delivery network system.

In some embodiments, a message is received at the customer user computing device from the delivery facilitation server indicating that the customer user has the option to cancel delivery. The customer user may be presented with the option to cancel for a predefined window of time after placing a request.

At operation 3008, the computing device receives a notification from the delivery system indicating that a delivery user has accepted the order and will be delivering the order to the customer user.

At operation 3010, the customer user computing device receives a notification that the order has been picked up.

At operation 3012, input is received from the customer use at the customer user computing device, indicating that delivery has taken place. The input could be a barcode scan, a photo, a customer user signature, a GPS signal, or a touch screen input.

Finally, at operation 3014, a delivery confirmation message is sent from the customer user computing device to the delivery network server. In some embodiments, the delivery confirmation message includes one or more of a photo of the delivered goods at the customer user's residence, barcode scans, customer user signatures, or a GPS signal. The customer user's order is then closed. In some embodiments the delivery network will request feedback and ratings of the delivery user.

In some embodiments, the notification messages and confirmation messages described above, such as a delivery confirmation message, are sent in real time to a customer user computing device or a delivery user computing device.

Figure 31:
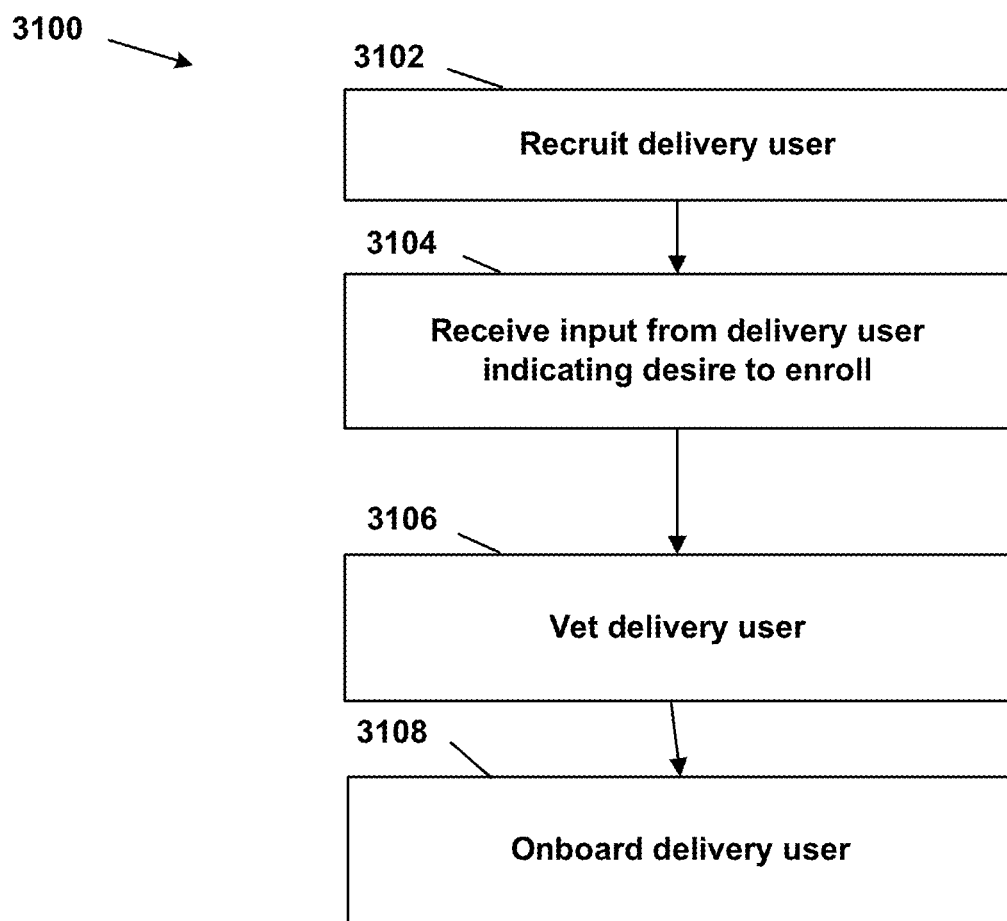
FIG. 31 is a flow diagram illustrating a method of enrolling a delivery user in a delivery network.
Figure 32:
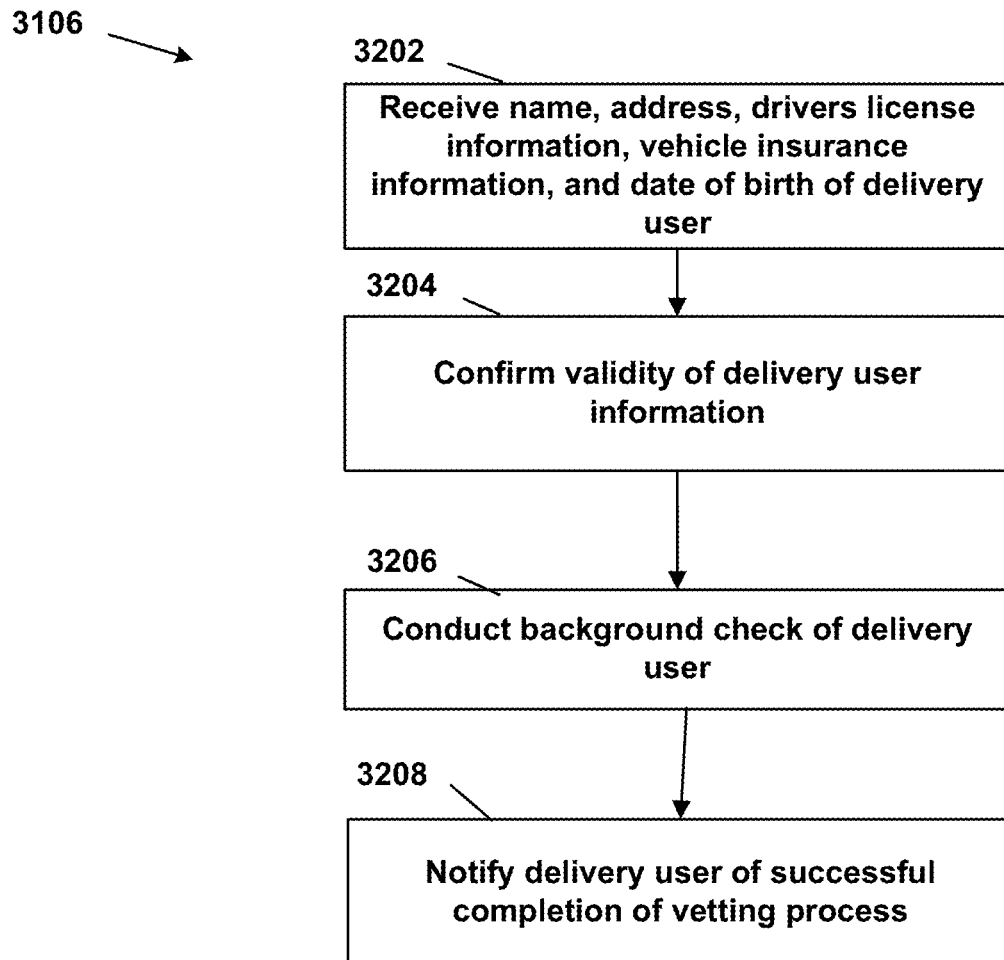
FIG. 32 is a flow diagram illustrating a method of vetting a delivery user.

FIGS. 31-32 describe methods of validating, vetting, and enrolling new delivery users into a delivery network. FIG. 31 is a flow diagram illustrating a method 3100 of enrolling a new delivery user. The method 3100 can be performed by the delivery facilitation server 112 of FIGS. 1 and 4. The method 3100 of enrolling new delivery users can be implemented before a delivery user can start delivering orders from a retailer to a customer user. One or more steps of the method 3100 can be optional depending on the preferences of the retailer.

At operation 3102, a delivery user is recruited. Recruiting can involve advertising opportunities for delivery drivers on a variety of mediums such as a retailer website, employment websites, social media applications, and other electronic outlets. Potential delivery users are invited to sign up to be a delivery driver.

At operation 3104, input is received from the delivery user at the delivery facilitation server 112, the input indicating that the delivery user desires to enroll in a delivery network. The delivery driver provides personal identifying information and indicates whether he or she will drive, walk, or both to complete deliveries.

At operation 3106, the delivery user is vetted using the personal identifying information provided by the delivery user. In some embodiments, the personal identifying information is merely validated to determine the general location of the user and the identity of the user. In some aspects, additional steps are involved such as background checks. A more detailed method of vetting delivery users that will make deliveries by driving is provided in FIG. 32.

If the potential delivery user passes the vetting process, the delivery user is invited to complete the onboarding process in operation 3108. Onboarding can involve sending program details and instructions to the delivery user. In some embodiments, the delivery user may be asked to complete a quiz to validate understanding of program rules and guidelines. The delivery user may also be invited to create a profile for use in the delivery network.

Upon conclusion of the onboarding process, delivery users can proceed to log into the delivery network and begin accepting deliveries to complete to customer users. For delivery networks that provide payment to delivery users, the delivery user can also set up a bank account or other method of receiving payments from the retailer or from customer users through the delivery network.

FIG. 32 is a flow diagram illustrating a method 3106 of vetting delivery users that will drive to complete deliveries for a retailer in exchange for payment. The vetting process can be operated by a delivery facilitation server 112.

At operation 3202, information is received from the potential delivery user. The information includes at least the delivery user's name, address, driver's license information, vehicle insurance information, and date of birth. The information can be received from a delivery user computing device 108.

At operation 3204, the delivery user's information is validated to confirm that the delivery user meets the requirements to perform deliveries for the retailer.

At operation 3206, a background check is conducted on the delivery user. The background check may be performed by a third party service.

If the potential delivery user passes all of the vetting processes, the delivery user is notified of successful completion at operation 3208. The delivery user is then invited to complete the onboarding process and start delivering orders. The delivery user can be notified via the delivery user computing device 108.

Embodiments of the present disclosure can be implemented as a computer process (method), a computing system, or as an article of manufacture, such as a computer program product or computer readable media. The computer program product may be a computer storage media readable by a computer system and encoding a computer program of instructions for executing a computer process. Accordingly, embodiments of the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved. Alternatively, one or more additional blocks may be added to any of the flowcharts and thus the order may change due to the one or more additional blocks.

While certain embodiments of the disclosure have been described, other embodiments may exist. Furthermore, although embodiments of the present disclosure have been described as being associated with data stored in memory and other storage mediums, data can also be stored on or read from other types of computer-readable media. Further, the disclosed methods' stages may be modified in any manner, including by reordering stages and/or inserting or deleting stages, without departing from the overall concept of the present disclosure.

The above specification, examples and data provide a complete description of the manufacture and use of the composition of the invention. Since many embodiments of the invention can be made without departing from the spirit and scope of the invention, the invention resides in the claims hereinafter appended. All references provided herein are incorporated herein by reference in their entirety.

The invention claimed is:

1. A computer-implemented method of facilitating delivery of goods to a customer user, the method comprising:
    establishing a neighborhood delivery network of users comprising a plurality of customer users and a plurality of delivery users having residences within a common neighborhood and each operating a user computing device, wherein the plurality of customer users and the plurality of delivery users in the neighborhood delivery network are from among a plurality of users enrolled in a social network defining a plurality of neighborhoods including the common neighborhood, wherein each user among the plurality of users in the social network is validated and categorized as having an address within a neighborhood of the plurality of neighborhoods;
    receiving, at a computing system, a request from one of the customer user computing devices, the request comprising a list of goods to be delivered from a retail location to a customer user from among the plurality of customer users;
    receiving, from at least one of the delivery user computing devices, a notification message indicating that a delivery user is currently at the retail location or has intent to travel to the retail location, wherein the delivery user has a residence address within the common neighborhood;
    based on the notification message from the at least one delivery user computing device indicating that the delivery user is currently at the retail location or will be traveling to the retail location, presenting information regarding the request and the customer user to the delivery user computing device;
    receiving, at the computing system, a notification message from the delivery user computing device that the delivery user will pick up and deliver the goods to the customer user;
    transmitting a notification to the customer user computing device indicating that the delivery user has accepted the request;
    receiving, at the computing system, a confirmation of order pickup from the delivery user computing device;
    receiving, at the computing system, notifications from the delivery user computing device including a GPS signal matching a location of the delivery user computing device;
    providing turn-by-turn directions for display on the delivery user computing device to the residence address of the customer user; and
    receiving, at the computing system, a delivery confirmation message in real time from the customer user computing device or the delivery user computing device that the requested goods have been delivered to the customer user.

2. The method of claim 1, wherein the confirmation messages are stored in a blockchain ledger.

3. The method of claim 1, wherein the delivery confirmation message includes a photo of the delivered goods at the customer user's residence.

4. The method of claim 1, further comprising sending notifications in real time to the customer user computing device when the computing system receives one or more of the pickup confirmation message, and the delivery confirmation message.

5. The method of claim 1, wherein the request from the customer user computing device further comprises identifying information of the customer user and a requested delivery time window.

6. The method of claim 1, further comprising receiving a barcode scan from a point of sale device to confirm which order the delivery user is picking up and receiving a matching barcode scan from the point of sale device that has scanned a barcode on a prepared order.

7. The method of claim 1, further comprising receiving ratings of the transaction from one or more of the customer user computing device and the delivery user computing device.

8. The method of claim 1, further comprising sending a reward to the delivery user computing device in the form of an exclusive benefit provided by a retailer that supplies the goods delivered to the customer user.

9. A method of facilitating delivery of goods from a retail store to a customer user, the method comprising:
receiving, from a delivery user computing device, a message indicating that a delivery user associated with the delivery user computing device wishes to join a neighborhood delivery network, the neighborhood delivery network comprising a plurality of delivery users and a plurality of customer users having residence addresses within a common neighborhood, wherein the plurality of delivery users and the plurality of customer users having residence addresses within the common neighborhood are from among a plurality of users enrolled in a social network defining a plurality of neighborhoods including the common neighborhood, wherein each user among the plurality of users in the social network is validated and categorized as having an address within a neighborhood of the plurality of neighborhoods;
receiving, at the delivery user computing device, a message indicating that the delivery user has been accepted into the neighborhood delivery network;
receiving input from the delivery user computing device indicating that the delivery user is currently at a retail store near the neighborhood or has intent to travel to the retail store near the neighborhood;
determining an anticipated route for the delivery user from the retail store to a destination;
based on the input from the delivery user computing device indicating that the delivery user is currently at the retail store or has intent to travel to the retail store, presenting, on the delivery user computing device, information about one or more of the plurality of customer users located within the common neighborhood that are requesting delivery of orders from the retail location;
receiving a selection from the delivery user computing device of an order associated with one of the customer users;
sending to a neighborhood delivery facilitation system, a notification message that the delivery user will pick up the customer user's order from the retail store;
receiving, at the delivery user's computing device, the customer user's order information and residence address;
providing turn-by-turn directions for display on the delivery user computing device from the retail store to the customer user's residence address;
receiving a message indicating that delivery has been completed to the customer user; and
communicating to the neighborhood delivery facilitation system a delivery confirmation message.

10. The method of claim 9, wherein the message indicating that delivery has been completed to the customer user is a GPS signal matching the customer user's residential address.

11. The method of claim 9, further comprising automatically receiving a non-monetary reward from the retailer at the delivery user computing device.

12. A method of ordering goods for delivery, the method comprising:
receiving, from a customer user computing device, a message indicating that a customer user associated with the customer user computing device wishes to join a neighborhood delivery network, the neighborhood delivery network comprising a plurality of customer users and a plurality of delivery users having residence addresses that are in a common neighborhood, wherein the plurality of customer users and the plurality of delivery users having residence addresses that are in the common neighborhood are from among a plurality of users enrolled in a social network defining a plurality of neighborhoods including the common neighborhood, wherein each user among the plurality of users in the social network is validated and categorized as having an address within a neighborhood of the plurality of neighborhoods;
providing, to the customer user computing device, a message indicating that the customer user has been accepted into the neighborhood delivery network;
receiving input from the customer user computing device requesting an order of goods to be delivered from a retail store;
communicating, to a delivery facilitation server, the customer user's order and the customer user's residence address;
receiving, from a delivery user computing device, a notification message indicating that a delivery user is currently at the retail store or will be traveling to the retail store, wherein the delivery user has a residence address within the common neighborhood;
based on the notification message from the at least one delivery user computing device indicating that the delivery user is currently at the retail location or will be traveling to the retail location, communicating, from the delivery facilitation server to the delivery user computing device, information about the customer user's order, wherein the delivery user has an anticipated route within a predetermined distance of the customer user's residence address;
receiving from the delivery facilitation server, a notification message that delivery user will pick up the customer user's order from the retail store;

receiving a confirmation message when the delivery user has picked up the order at the retail store;

providing turn-by-turn directions for display on the delivery user computing device to the customer user's residence address; and receiving, at the customer user computing device, input indicating that delivery has been completed to the customer user.

13. The method of claim 12, further comprising automatically sending a delivery confirmation message to a delivery facilitation server.

14. The method of claim 12, further comprising receiving a message from the delivery facilitation server with an option to cancel delivery.

15. The method of claim 12, further comprising receiving input from the customer user rating the delivery user and sending the rating to the delivery facilitation server.

16. The method of claim 12, further comprising sending an address to the delivery facilitation server to validate the customer user by the neighborhood social media network.

17. The method of claim 12, wherein messages are recorded with a time stamp at a blockchain ledger.

18. A delivery facilitation system useable to coordinate deliveries of goods from a retailer to a customer user, the delivery facilitation system comprising:

a delivery facilitation server including a processor and a memory communicatively connected to the processor, the memory storing instructions executable by the processor to:

establish a neighborhood delivery network of users comprising a plurality of customer users and a plurality of delivery users having residences within a common neighborhood and each operating a user computing device, wherein the plurality of customer users and the plurality of delivery users in the neighborhood delivery network are from among a plurality of users enrolled in a social network defining a plurality of neighborhoods including the common neighborhood, wherein each user among the plurality of users in the social network is validated and categorized as having an address within a neighborhood of the plurality of neighborhoods;

receive requests from customer user computing devices, each request comprising an order for delivery of goods from a retailer to a customer user at a location within the common neighborhood;

receive notification messages from delivery user computing devices indicating that one or more delivery users are currently at the retailer or will be traveling to the retailer, wherein the one or more delivery users have a residence address within the common neighborhood;

based on the notification messages from the delivery user computing devices indicating that the one or more delivery users are currently at the retail location or will be traveling to the retailer, present requests to at least one of the one or more delivery users, where the one or more delivery users have an anticipated route within a predetermined distance of the customer user's location; and receive notifications from delivery user computing devices upon acceptance of a customer user's request; and automatically generate confirmation messages, the confirmation messages being generated at least upon successful delivery of a customer user's order.

19. The system of claim 18, wherein the memory storing instructions is further executable by the processor to automatically deliver rewards to delivery user computing devices upon successful completion of deliveries to customer users.

20. The system of claim 18, wherein the memory storing instructions is further executable by the processor to receive ratings of delivery users from customer user computing devices and ratings of customer users from delivery user computing devices.

21. The system of claim 18, wherein the confirmation messages are stored in a blockchain ledger.

22. The system of claim 19, wherein the rewards are exclusive benefits provided by the retailer.

23. The method of claim 1, wherein the delivery user has his or her own goods to pick up at the retail location.

24. The method of claim 1, wherein the notification message indicating that the delivery user is currently at the retail location or has intent to travel to the retail location includes an indication that the delivery user has intent to trail to the retail location within a predetermined amount of time.

* * * * *